(12) United States Patent
Wilson et al.

(10) Patent No.: US 8,419,035 B2
(45) Date of Patent: Apr. 16, 2013

(54) BICYCLE TRAILER AND METHOD

(75) Inventors: Joel A. Wilson, Eugene, OR (US);
Gwen E. Spencer, Corvallis, OR (US);
Aaron P. Beese, Eugene, OR (US);
Christopher L. Casler, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 315 days.

(21) Appl. No.: 12/887,336

(22) Filed: Sep. 21, 2010

(65) Prior Publication Data
US 2011/0068560 A1 Mar. 24, 2011

Related U.S. Application Data

(60) Provisional application No. 61/244,799, filed on Sep. 22, 2009.

(51) Int. Cl.
*B62K 27/00* (2006.01)

(52) U.S. Cl.
USPC .......................................................... 280/204

(58) Field of Classification Search .................. 280/204, 280/292
See application file for complete search history.

(56) References Cited

U.S. PATENT DOCUMENTS

| | | | |
|---|---|---|---|
| 3,596,554 A | | 8/1971 | Low et al. |
| 3,829,125 A | * | 8/1974 | Davis ............................. 280/204 |
| 3,848,890 A | | 11/1974 | MacAlpine |
| 4,174,120 A | * | 11/1979 | Freeman ....................... 280/204 |
| 4,721,320 A | | 1/1988 | Creps et al. |
| 5,020,814 A | | 6/1991 | George et al. |
| 5,242,178 A | | 9/1993 | Galasso et al. |
| 5,267,744 A | | 12/1993 | Berry et al. |
| 5,695,208 A | | 12/1997 | Baechler et al. |

(Continued)

FOREIGN PATENT DOCUMENTS

| | | |
|---|---|---|
| JP | 51-032844 | 3/1976 |
| JP | 59-179169 | 11/1984 |
| JP | 3147206 | 11/2008 |

OTHER PUBLICATIONS

Office action dated Sep. 13, 2011, issued in corresponding U.S. Appl. No. 12/887,362, filed Sep. 21, 2010.

(Continued)

*Primary Examiner* — Tony Winner
(74) *Attorney, Agent, or Firm* — Klarquist Sparkman, LLP

(57) ABSTRACT

A trailer for towing by a bicycle is disclosed comprising a tow arm adapted for coupling by a hitch to the bicycle. The tow arm is pivotally coupled to an upper portion of the trailer frame and can be collapsed against the frame. The frame can comprise plural frame sections that can also pivot to a collapsed position and a lower shelf foldable to a collapsed position as well. Locking elements can be provided for selectively locking the trailer components against relative pivoting motion. One or more actuators for selectively locking and unlocking the frame components can be provided. One such actuator can simultaneously unlock first and second transversely spaced apart hinge elements. The hitch can comprise a flexible coupling that provides torsional resistance against rolling motion of the trailer, particularly when the trailer is mounted to a seat post or other location above the rear wheel of the bicycle. The flexible hitch coupling can provide a progressively increasing torsional resistance to such rolling while allowing pivoting of the trailer relative to the bicycle as the bicycle is steered and flexing to accommodate variations in pitch between the bicycle and trailer.

43 Claims, 19 Drawing Sheets

U.S. PATENT DOCUMENTS

| | | | |
|---|---|---|---|
| 5,785,335 | A | 7/1998 | George |
| 5,979,921 | A | 11/1999 | Derven et al. |
| 6,099,008 | A | 8/2000 | Caffey |
| 6,286,847 | B1 | 9/2001 | Perrin |
| 6,290,246 | B1 | 9/2001 | Lin |
| 6,616,164 | B1 | 9/2003 | Schlitter et al. |
| 6,983,947 | B2 | 1/2006 | Asbury et al. |
| 7,131,657 | B1 | 11/2006 | Witt |
| 7,766,358 | B1 | 8/2010 | Phillips |

OTHER PUBLICATIONS

Notice of Allowance dated Nov. 2, 2011; issued in corresponding U.S. Appl. No. 12/887,362, filed Sep. 21, 2010.
Allowed Claims from corresponding U.S. Appl. No. 12/887,362, filed Sep. 21, 2010.
International Search Report and Written Opinion dated May 13, 2011, issued in corresponding PCT Application No. PCT/US2010/048255, filed Sep. 9, 2010.
Weber M-Hitch Mounting Instructions; hitch first seen in Sep. 2010 after the product of the subject patent application was completed; obtained from website; 2 pages.
Andersen shopping cart hitch and folding frame images; provided by client; 10 pages; prior art.
Bike-Hod; trailer and hitch images and descriptions; obtained from website; 6 pages; prior art.
Bikes at Work; Model 32A Bike Cart and hitch specifications and images; obtained from website; 5 pages; prior art.
BicycleR Evolution; "The Shopper" trailer and hitch description; obtained from website; 3 pages; prior art.
Bykaboose trailer and hitch specifications and photos; obtained from website; 2 pages; prior art.
Burley Nomad trailer and hitch specifications; obtained from website; 1 page; prior art.
Burley Child Trailers manual; obtained from website.
Carry Freedom "Y-Frame" specifications; obtained from website; 4 pages; prior art.
Carry Freedom "Y-Frame" manual; obtained from website; 8 pages; prior art.
Carry Freedom "City" specifications; obtained from website; 5 pages; prior art.
Carry Freedom "City" manual; obtained from website; 15 pages; prior art.
Croozer "Travel" trailer and hitch specifications; obtained from website; 1 page; prior art.
Croozer "Cargo" trailer and hitch specifications; obtained from website; 1 page; prior art.
Leggerro Max manual; obtained from website; 4 pages; prior art.
Oxtail "The Trailer" trailer and hitch specifications; obtained from website; 3 pages; prior art.
Paddle Boy "Tug" shopping cart and hitch, images provided by client; 1 page; prior art.
Quik-Pak miscellaneous cargo trailer and hitch images and information; obtained from website; 2 pages; prior art.
Roland models "Mini" and "Carrie M2" trailer and hitch specifications; obtained from website; 3 pages; prior art.
Radical Design "Cyclone III" and "Cargo III" trailer and hitch specifications; obtained from website; 2 pages; prior art.
Tony's Trailers "Grocery Getter" Model D; trailer and hitch specifications; obtained from website; 5 pages; prior art.
Weber hitch photographs; Model H; 1 page; prior art.
Wike "Tourite" Touring Trailer and hitch specifications; obtained from website; 2 pages; prior art.
Wike "Shopper" trailer and hitch specifications; obtained from website; 3 pages; prior art.
Wike trailer manual; obtained from website; 10 pages; prior art.
Winther "Donkey" trailer and hitch description; obtained from website; 4 pages; prior art.

* cited by examiner

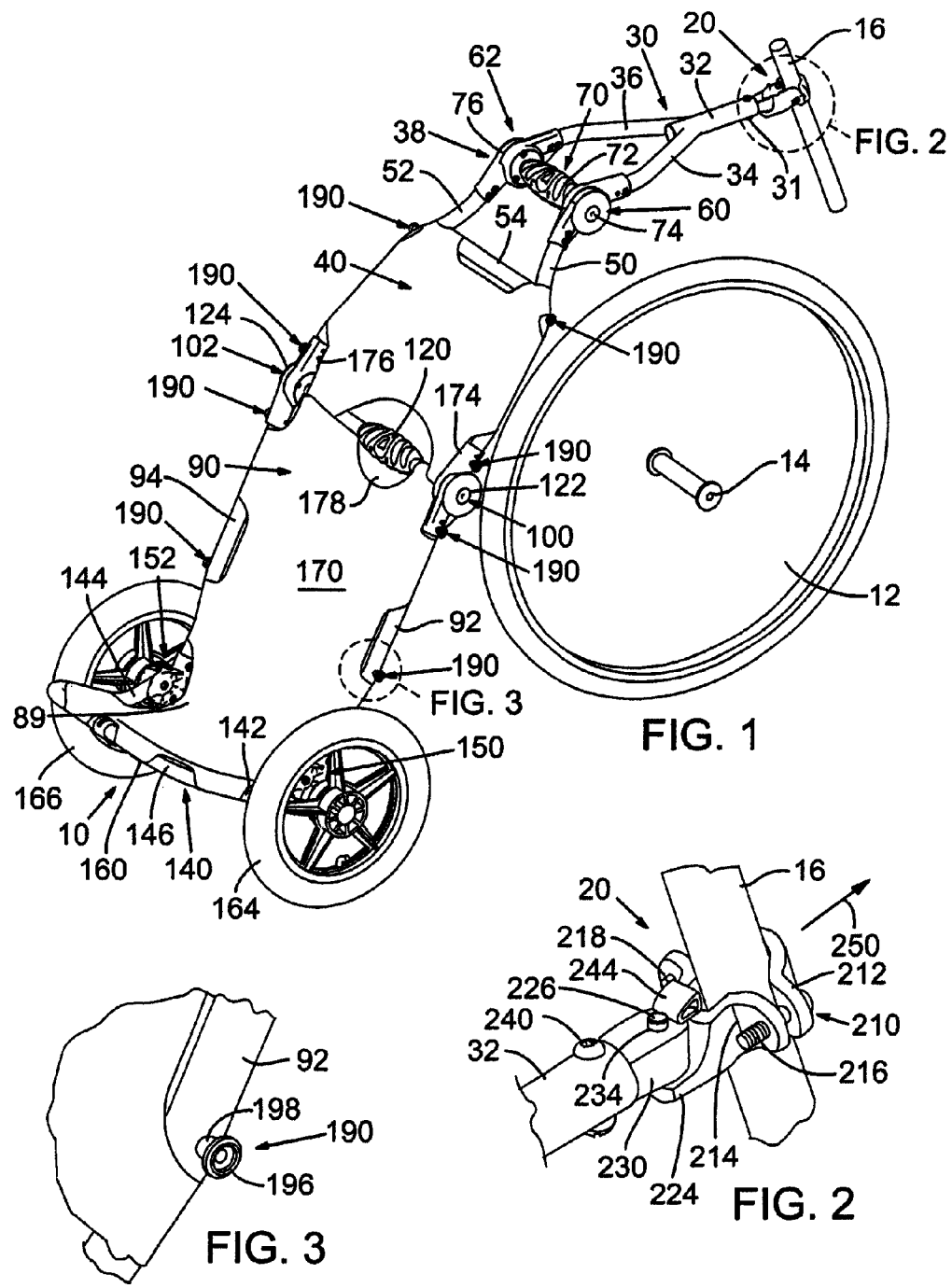

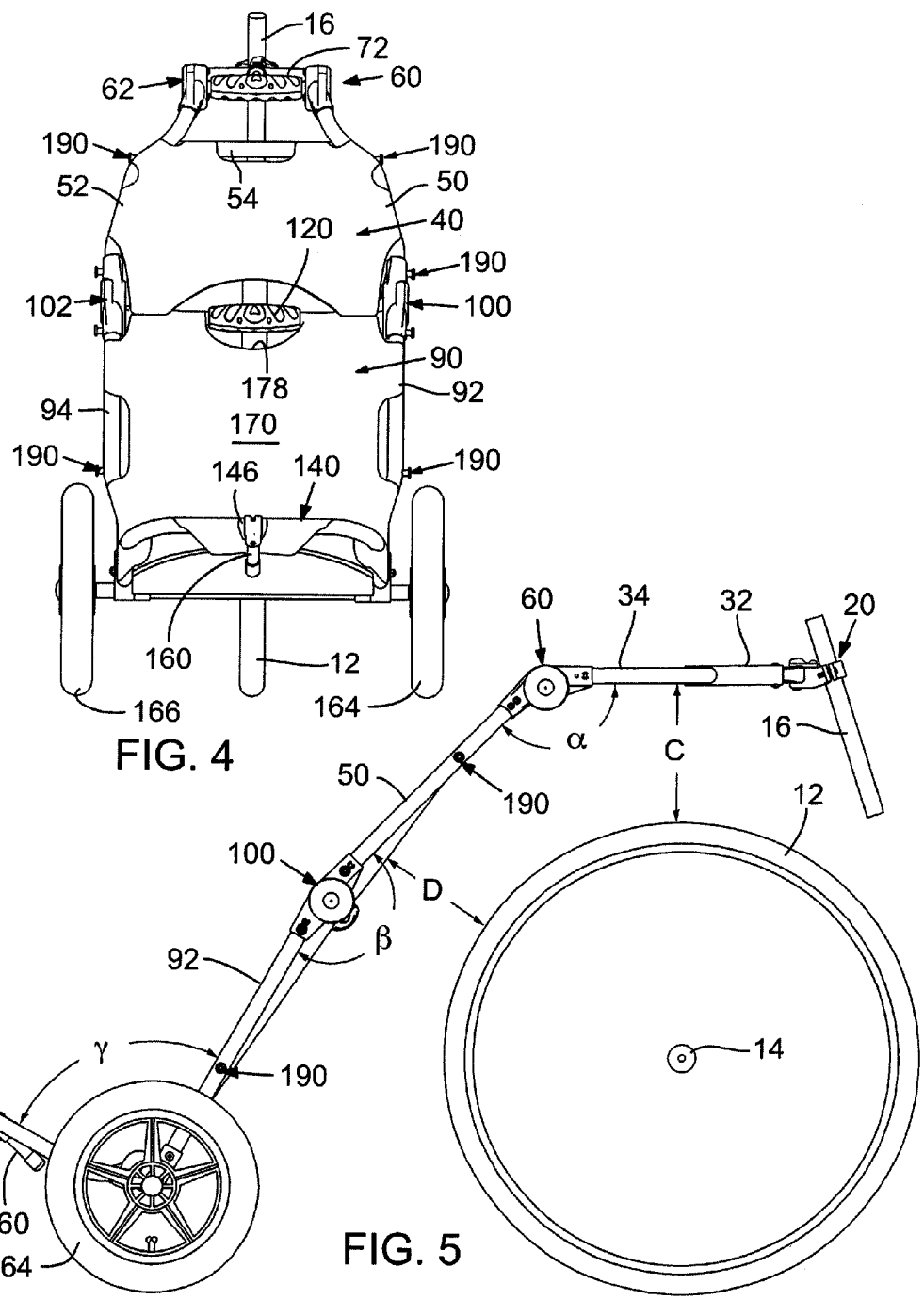

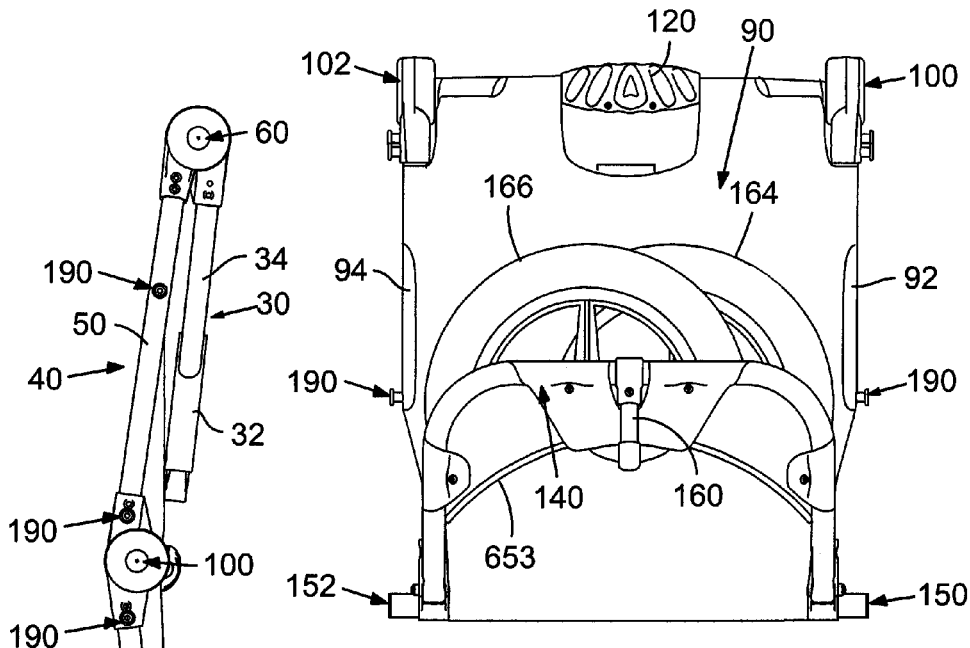
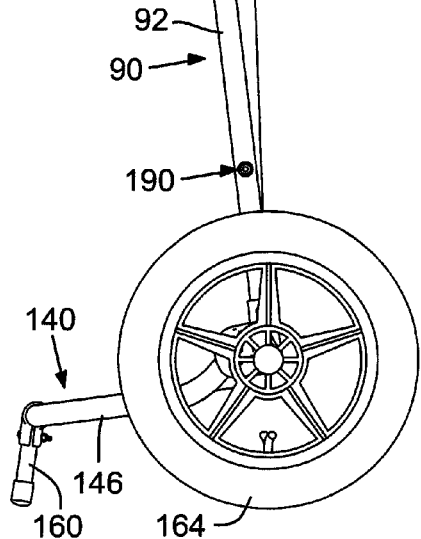
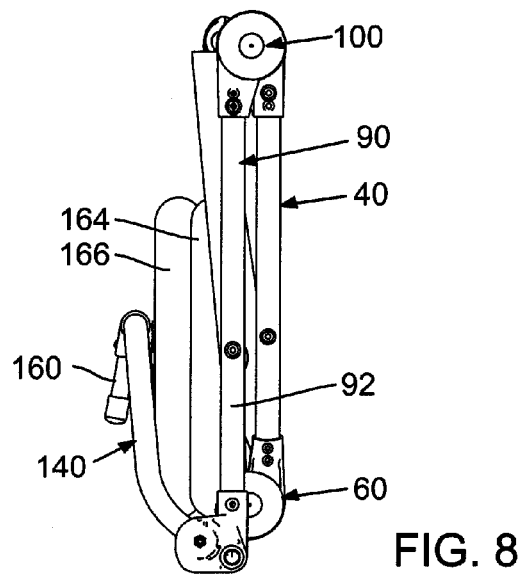
FIG. 6
FIG. 7
FIG. 8

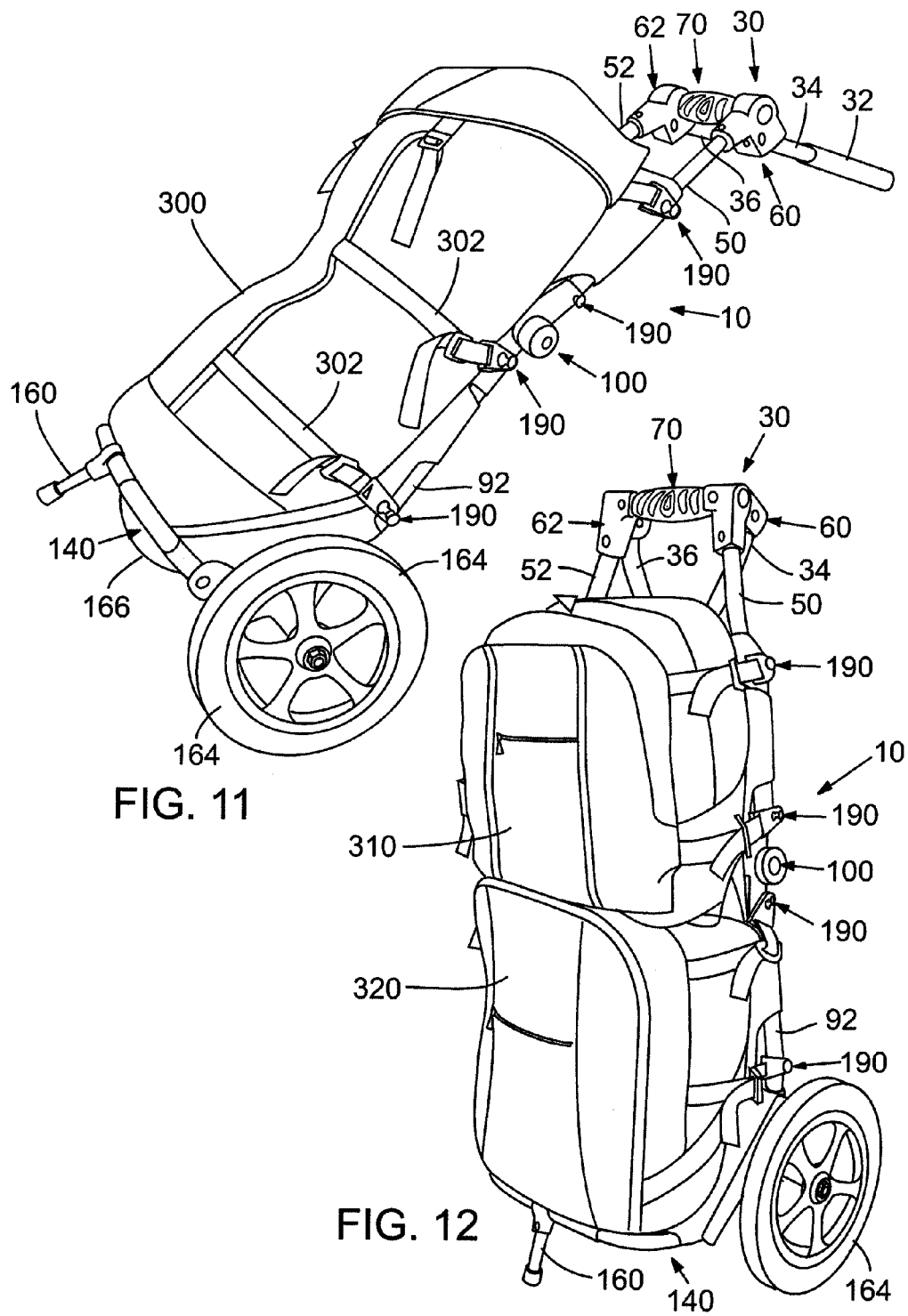

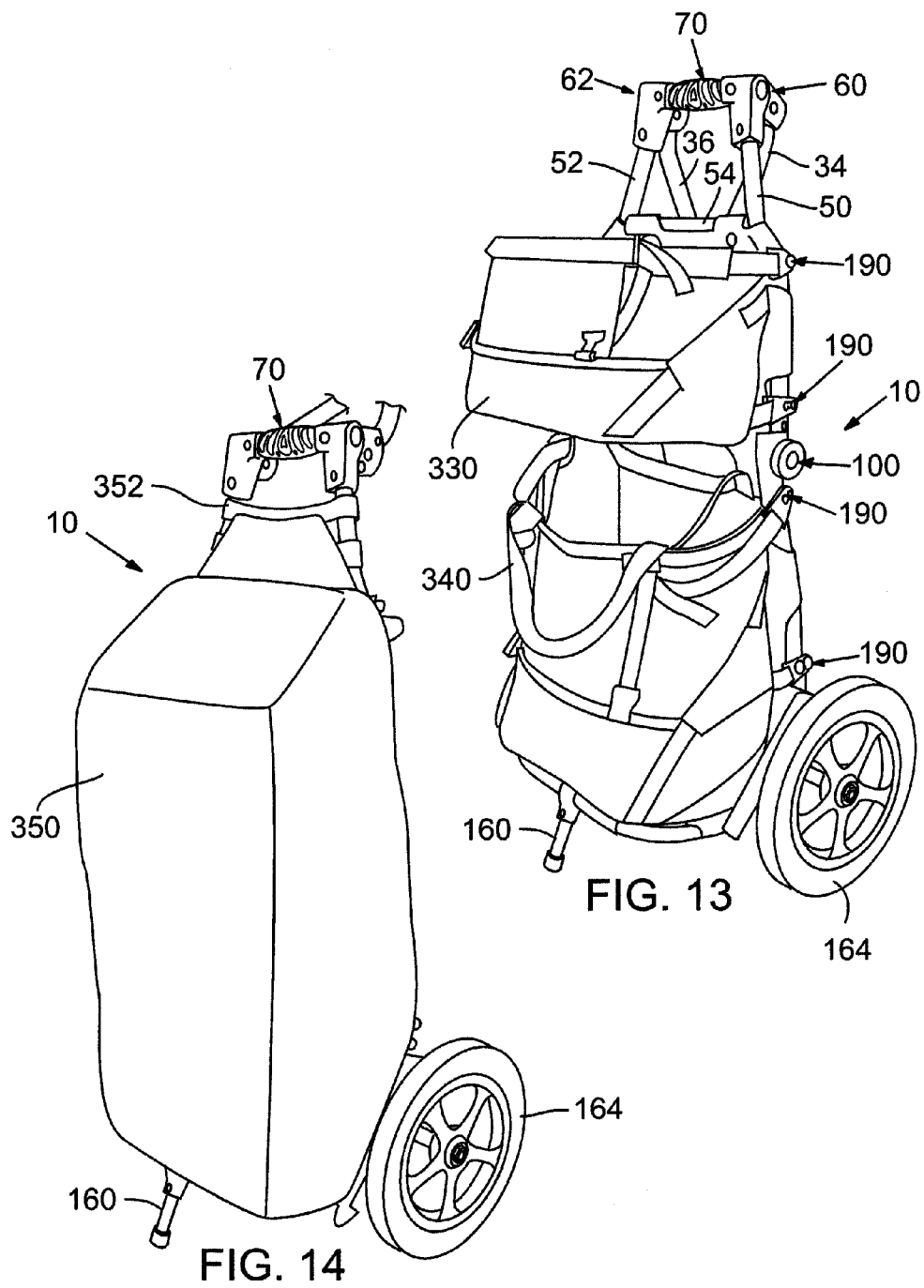

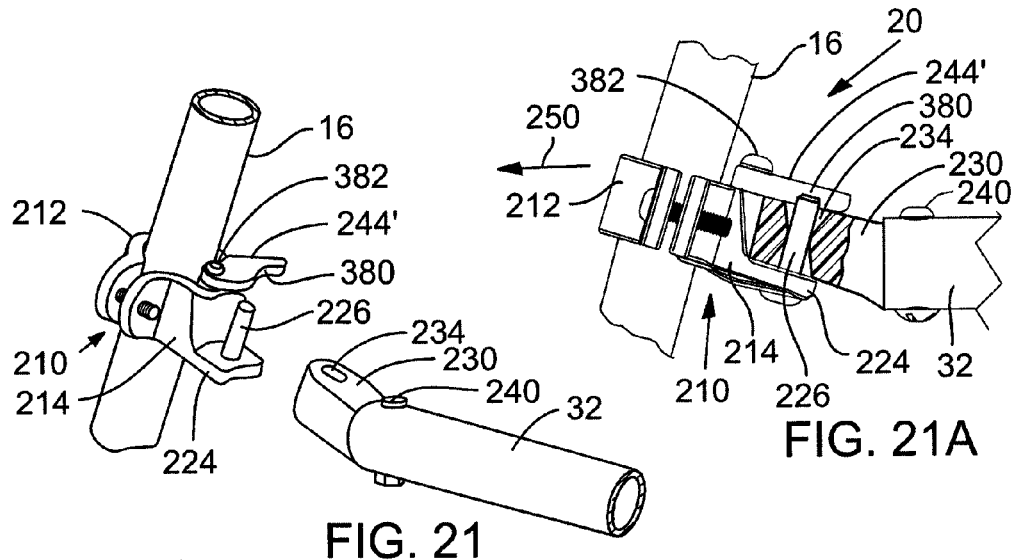
FIG. 21
FIG. 21A
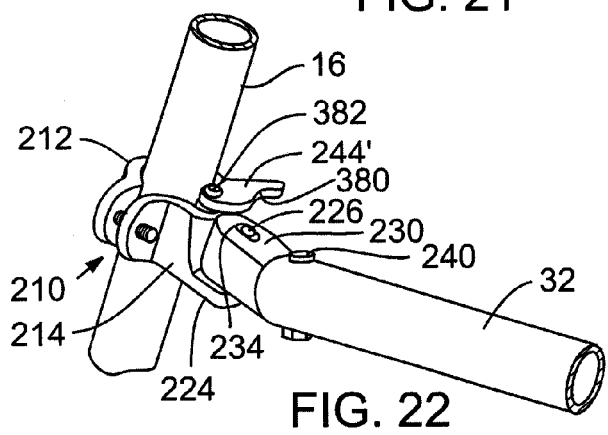
FIG. 22
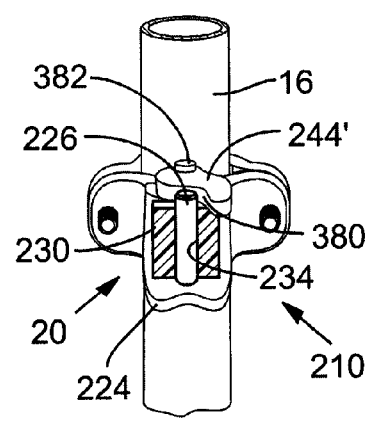
FIG. 21B
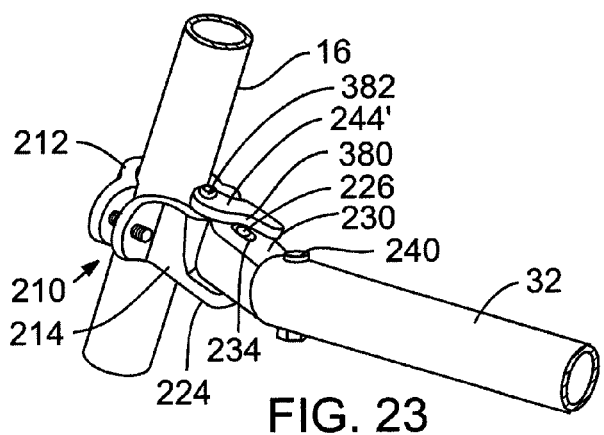
FIG. 23

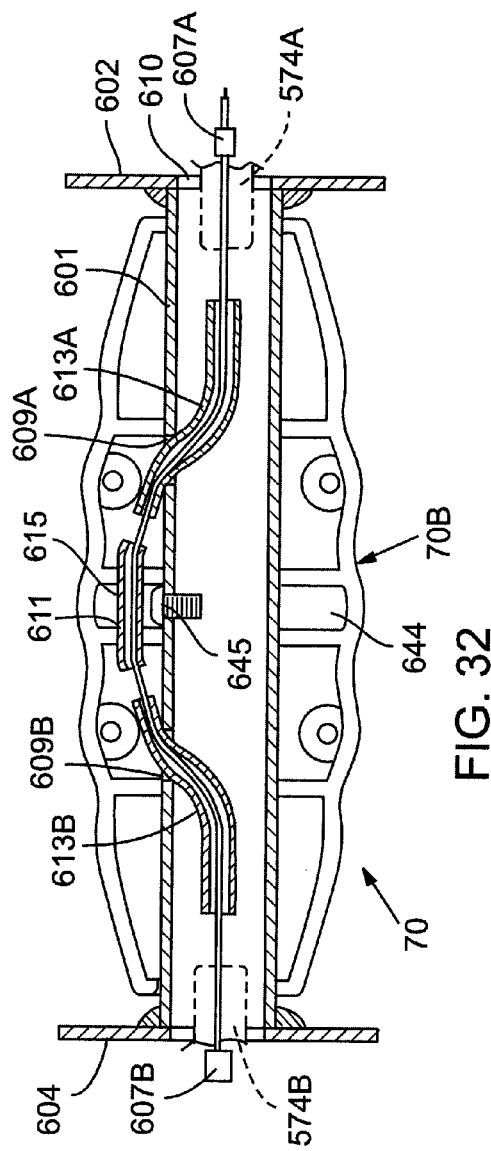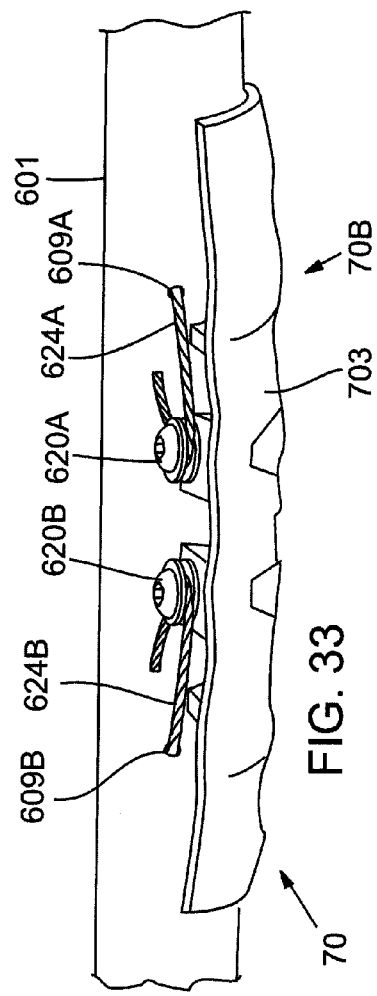
FIG. 32
FIG. 33

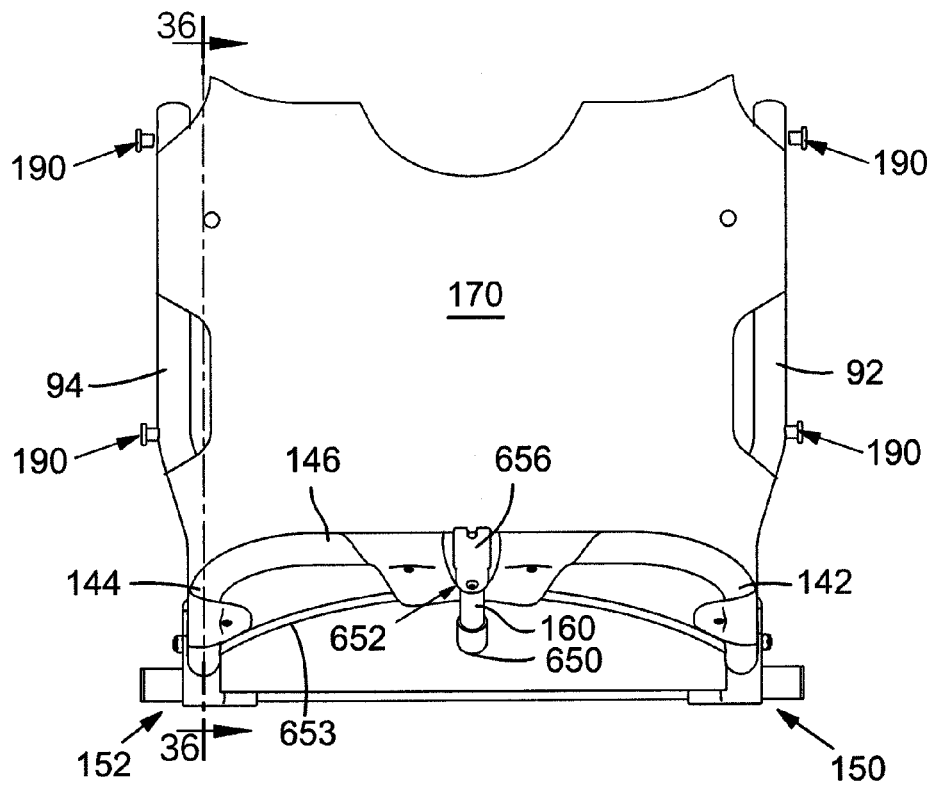
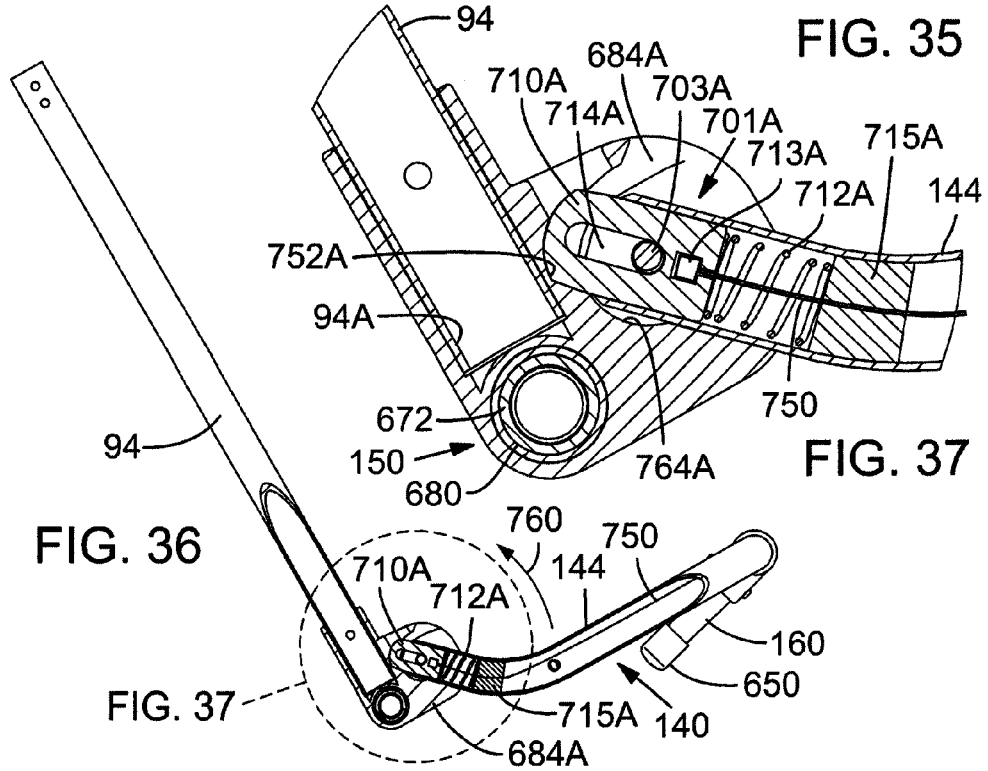

BICYCLE TRAILER AND METHOD

CROSS REFERENCE TO RELATED APPLICATION

This application claims the benefit of U.S. Provisional Application No. 61/244,799, filed Sep. 22, 2009, which application is incorporated herein in its entirety.

TECHNICAL FIELD

This disclosure relates to bicycle trailers, to hitches for such trailers and to related methods.

SUMMARY

In accordance with an aspect of an embodiment of a bicycle trailer, the trailer can be folded at upper and intermediate hinge locations. In addition, a lower support can be foldably coupled to the body by lower hinges at a lower hinge location. One or more of these locations, and desirably the upper and intermediate locations, can be selectively secured against folding by a lock and lock actuator mechanism, such as a dual actuated lock release. In a first actuating mode, a first release can be operated such as by a single hand of the user, such as by twisting a handle about a transverse access that spans the trailer frame to release towing component locking hinges. When these hinges are released, towing components of the trailer can pivot relative to load or frame supporting portions of the trailer to, for example, allow the towing components to fold toward the body of the load carrying components. In addition, a second similar release mechanism can be used to permit the release of the intermediate frame hinges to permit relative folding of upper and lower load carrying portions or frame sections of the trailer, such as to collapse them together. This second release can also utilize a handle pivoted about a transverse axis relative to the frame to allow single handed release the intermediate frame hinges. In a second operating mode, a push button, or other manually activated release, can be located at each side of the frame adjacent to upper hinges and intermediate hinges for actuation by the user to release the hinges and to permit folding of the trailer.

In accordance with an embodiment, a similar hinge folding mechanism can be used for operation of the hinges for the lower support platform. However, in one embodiment, a prop or stand is pivoted to a distal portion of the load carrying support portion and coupled via a cable or other elongated release to the lower hinge components that pivotally couple the lower support to a lower portion of the load carrying portions of the trailer frame. Movement of the prop, for example, pivoting of the prop relative to the supporting distal portion of the lower support, applies tension to the cable or release mechanism and releases the lower support hinges to allow folding of the lower support or shelf toward the trailer body portions. A wheel or roller can be mounted to the prop to facilitate rolling of the trailer if the wheel is positioned on a support surface. Separate releases for the support can alternatively be provided at each of the platform hinges or a common cable actuated release operable separately from the prop or support can be used.

In accordance with another aspect of an aspect of an embodiment, a trailer hitch can be provided that increases the stability of the trailer when the trailer is towed, from a trailer to bicycle connection location that is above the rear axle of a bicycle wheel and more desirably above the entire wheel, such as being coupled to a rack mounted to the frame of the bicycle behind a seat post or to a bicycle seat post.

As yet another aspect of an embodiment, a plurality of load tie down projections or luggage connectors can be mounted to frame components of the trailer. In one form, these projections can have an enlarged head with a shank of reduced cross sectional dimension with the shank being secured to the trailer frame. These projections can be used to, for example, secure load carrying bags to the trailer frame. For example, load carrying bags can be provided with connectors (such as frame connectors) comprising a first opening sized in cross section to be greater than the cross sectional dimension of the head of the tie down projections and with a slot of a cross sectional dimension smaller than the cross sectional dimension of the head and larger than the cross sectional dimension of the shank of the head. As a result, these connectors can respectively be placed over the head of an associated tie down with the shank of the tie down positioned in the reduced dimensioned slot of the associated connector to releasably secure a bag to the trailer frame. Plural rows of luggage connectors, such as four vertically spaced apart rows, each row comprising at least a first luggage connector at one side of the trailer and a second luggage connector at the opposite side of the trailer, can be used.

In accordance with yet another aspect of an embodiment, the frame of the trailer, or portions thereof, can be covered with a durable "skin" material. Examples include, but are not limited to, fabric, but can include rigid materials such as metal installed so that the skin does not interfere with folding of the trailer. Articulated skins can be used. In a particularly desirable embodiment, upper and lower frame portions are covered by a polymer sheet material, such as low density polyethylene. The sheet material can terminate below the upper hinges. Also, an opening can be provided through a central portion of the sheet material in the region of the intermediate frame hinges to permit access to a release handle if such a handle activated hinge release is used.

In one embodiment, folding of the trailer can be accomplished through the use of four independent hinged joints comprising:

Tow Arm and Hinge:
  The top of the trailer can comprise a tow arm which can be pivoted to an extended position for attachment to a bicycle, or for use as a cart handle. The tow arm can be folded out of the way when the trailer is used as a cart. The length of the tow arm can be approximately one half of the length of the back plane to maximize economy of space for storage. Folding of the towing components can be accomplished using a pair of co-axial hinges that can be constructed, for example, to lock in two set positions, such as approximately 135 degrees apart. In one embodiment, two methods are provided to release these hinges and allow rotation of the tow arm between these two positions. The primary release mechanism can be a twist grip mechanism that simultaneously disengages both locking hinges to allow rotation of the tow arm between the two positions. The hinges can also be released by depressing a button on each hinge. Therefore, the towing components can still be released for pivoting in the unlikely event that the primary or handle release should fail. Alternatively, a single release mechanism can be provided or stops can be used without a release mechanism.

Back Plane and Hinge:
  The back plane or frame can comprise a plurality of sections, such as two frame sections of approximate equal length joined by a pair of co-axial locking hinge elements that can provide, for example, two frame positions, such as approximately 170 degrees apart. These hinges can be similar in form and function to the tow arm hinges described above.

Loading Platform and Hinge:

At the bottom of the cart a loading platform or shelf can be provided that can be folded between, for example, two positions. The loading platform in the in-use position can be angled approximately 90 degrees from the back plane of the frame. In this position, the loading platform hinges can, in an embodiment, be locked to prevent unintended folding. The platform can include locking hinges that can be released to allow the loading platform to fold to a compact storage position approximately parallel to the back plane. In this storage position the loading platform can be held in position by a retainer, such as a détente that provides internal tension in the hinge elements. Plural mechanisms can be provided to release the platform hinges and allow folding of the loading platform to the stowed position. The primary release can be a single point release, releasing both hinges simultaneously through one action. The locking hinges can also be released independently, in one example, such as by pressing a latch actuator on each hinge. Alternatively, a single platform or shelf release mechanism can be used. As another alternative, one or more stops without a release mechanism can be used.

Support and Hinge:

A supporting element can be located at the distal end of the loading platform opposite to its hinges. This support element can comprise one or more posts or props that can rotate from a stowed position, such as approximately parallel to the loading platform, to a supporting position, such as approximately 100 degrees from the loading platform. The hinge for the supporting element can have respective détente positions to limit its motion to the extremes of its rotation. The support can be provided with a caster, wheel or other roller for use in rolling the assembly when in an upright position. The support can also comprise a hinge release actuator with the support activating release to allow the support platform to pivot, such as a cable release, when the support is pivoted to one position. A cable or other shelf release operable independently of the support can alternatively be used. Alternatively, one or more stops or shelf pivot limiting mechanisms can be used to limit the deployed position of the shelf without a release mechanism.

Some exemplary features of embodiments of the trailer can comprise one or more of the following:

Flexible hitch coupling that allows required motion and restricts undesired motion.

Proportional geometry of articulating frame that provides good utility for towing when fully open, useful handle height when tow arm is folded, and compact size when frame is fully folded.

Unique locking hinge design for tow arm and back plane that provides secure locking, minimal backlash and easy release.

Locking hinge design and release mechanism for a loading platform.

Accessory attachment system comprised of posts attached to frame that accept female swivel-lock connectors.

One or more of the following advantages, and optionally all of them, can be achieved by embodiments of the trailer of the illustrated construction. These advantages comprise one or more of:

Enhanced cargo capacity.

Can stand in an upright position for easy loading.

Accommodates various loading options including special designed backpack, pannier or luggage style bags, or generic loads such as rigid boxes, tools, golf clubs, buckets, trash cans, etc. through use of tie down straps or cargo nets. Large load capacity (e.g. 50 to 75 pounds).

Easy mounting and removal of load carrying bags.

Folds to a compact substantially flat shape for storage/transport. Trailer can remain closed (e.g., locked in a folded or collapsed condition) when folded.

Works indoors (e.g., as a cart) as well as out, carrying a load from source to destination, reducing the number of transitions.

Easily transports in public spaces: small footprint.

Easy attachment to bicycles of varying types.

Stable when towed behind a bicycle.

Short wheelbase compared to other trailers, thereby improving maneuverability both on and off the bike.

Lightweight.

Can be converted from a trailer to a cart using one hand.

Water resistant.

Quiet to operate.

Can be provided to a user in an assembled state.

Aesthetically pleasing.

Easy to use in stores when converted to a push cart without drawing attention to the cart and with desirable maneuverability.

In accordance with an embodiment, a plural (e.g. two) wheeled cart is provided that can be both towed behind a bicycle and pushed or pulled by hand. In one embodiment, the trailer comprises or consists of:

A rigid frame containing a back plane and a lower shelf.

Mounting features to attach bags, tie-down straps or cargo net to the back plane.

First and second wheels such as at the approximate intersection of the back plane and lower shelf.

One or more supporting members on the bottom of the lower shelf opposite the wheel axis to provide support so the cart may stand upright.

A handle at the top of the frame for pushing or pulling the cart on its wheels.

A tow arm at the top of the back plane to attach to a bicycle.

A coupling mechanism to attach/detach the tow arm to a bicycle at an end portion of the tow arm.

An articulating joint near the coupling mechanism that both allows the cart to tow naturally behind a bicycle while minimizing the interference with the handling of the bicycle and while resisting undesirable and unstable motion of the trailer that could cause the trailer to flip over.

In accordance with other aspects of embodiments, the trailer can comprise one or more of:

Articulating frame components for compact transportation and storage.

Rigid latches with ergonomic releases for articulating joints.

Removable wheels for compact transportation and storage.

Large road going tires for quiet, stable and efficient towing.

Optional aluminum, and/or other durable material, construction for corrosion resistance and light weight.

A skin that can be, for example, comprised of polymer for weather protection and easy cleaning.

These and other aspects of embodiments of bicycle trailers in accordance with this disclosure will be more readily apparent from the following detailed description and accompanying drawings. The invention comprises all novel and non-obvious combinations and sub-combinations of such features as well as the novel and non-obvious elements themselves and related methods.

BRIEF DESCRIPTION OF THE DRAWINGS

FIG. 1 is a perspective view of one embodiment of a bicycle trailer and portion of a bicycle, namely the rear wheel of the bicycle and a portion of a seat post thereof.

FIG. 2 is a perspective view of an embodiment of a hitch that can be used with the bicycle trailer of FIG. 1 and that can comprise a portion of the bicycle trailer.

FIG. 3 is an enlarged view of one form of a luggage connector or tie down that can be used for detachably securing luggage, such as bags, containers and the like to the bicycle trailer.

FIG. 4 is a front view of the bicycle trailer of FIG. 1 without the hitch.

FIG. 5 is a side elevational view of the bicycle trailer of FIG. 1 without a skin or other covering attached to the bicycle trailer.

FIG. 6 is a side elevational view of the bicycle trailer of FIG. 5 with towing components (a tow arm) thereof in a collapsed or folded position and with a support or prop deployed to assist the trailer in standing in an erect orientation.

FIG. 7 is a front view of the bicycle trailer of FIG. 1 with towing components and an articulated frame shown in a folded position, with a load supporting shelf in a folded position, and with wheels for the trailer detached and carried in the space between the load supporting shelf and one of the frame sections.

FIG. 8 is a side elevational view of the collapsed bicycle trailer of FIG. 7.

FIG. 11 is a perspective view of a bicycle and trailer in accordance with an embodiment with a first form of luggage attached thereto.

FIG. 12 is a perspective view of a bicycle frame in accordance with an embodiment with upper and lower pieces of luggage detachably mounted to the frame of the bicycle trailer, with the towing components of the bicycle trailer in a collapsed position, and with a support or prop deployed to support the trailer and carried luggage in an upright orientation.

FIG. 13 is a view of an embodiment of a bicycle trailer similar to the view of FIG. 12 with still further types of luggage detachably mounted to the trailer.

FIG. 14 is a view of an embodiment of a trailer similar to FIG. 13 with a rainfly deployed from a rainfly container carried by the bicycle trailer and positioned to cover the luggage being transported by the trailer.

FIGS. 21, 22 and 23 illustrate the hitch of FIGS. 18-20 shown in respective detached, in the process of being attached, and attached positions.

FIG. 21A is a vertical sectional view in a fore/aft direction through a portion of a flexible coupling incorporated in the hitch of FIG. 21 to show a pin receiving aperture or opening therethrough.

FIG. 21B is a vertical sectional view taken perpendicularly to the view of FIG. 21A and also showing the pin and pin receiving opening looking in this direction.

FIG. 32 is a view of a portion of a twist actuator that can be used to lock and release locking mechanisms for the hinges of the embodiment of FIG. 31.

FIG. 33 is a view of an alternative form of twist actuating locking and unlocking mechanism.

FIG. 35 is a front view of the bicycle trailer portion of FIG. 34 in an assembled state.

FIG. 36 is a partially broken away side elevation view of the bicycle trailer portion of FIG. 35 taken along line 36-36 in FIG. 35.

FIG. 37 is an enlarged view of a hinge portion of the bicycle trailer portion of FIG. 36 enclosed in dashed lines in FIG. 36.

DETAILED DESCRIPTION

Figure 9:
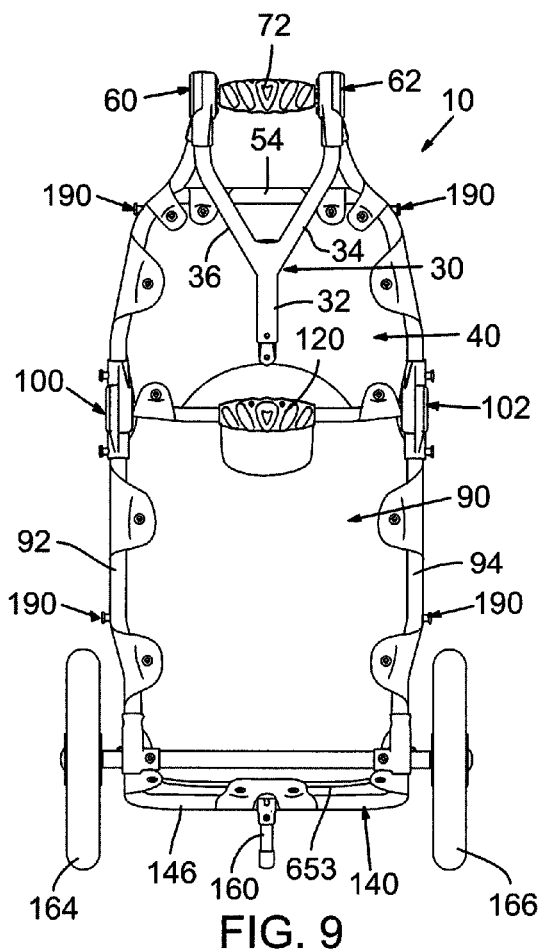
FIG. 9 is a rear view of the bicycle trailer of FIG. 1 with towing components shown in a collapsed or folded position.

This disclosure relates to a trailer for towing by a bicycle, hence a bicycle trailer, comprising one or more of the new and non-obvious features disclosed herein, to novel and non-obvious components disclosed herein, and to related methods.

FIG. 1 illustrates an embodiment of a trailer for towing by a bicycle (not shown) but having a rear wheel 12 that rotates about the transverse axis of a rear bicycle axle 14. A seat supporting post 16 of the bicycle is also shown in FIG. 1, as an example location for coupling of the trailer to the bicycle by a hitch 20. Alternatively, a hitch coupling rack can be mounted to a portion of the frame of the bicycle, typically behind the seat but above the wheel of the bicycle. Thus, desirably the trailer is coupled to the bicycle at a location above the axle 14 of the bicycle and more desirably at an elevation above the rear wheel 12 of the bicycle. It should be noted that the term bicycle in this description is intended to broadly encompass a pedal powered (or at least partially pedal powered) vehicle having two or more wheels, such as bicycles with two or more rear wheels and bicycles with only one front and one rear wheel. Thus, the term bicycle is not to be construed as limited to only two wheeled vehicles.

The illustrated trailer comprises a towing structure or tow arm 30 that can comprise a tow arm member 32 and frame coupling components, such as first and second towing legs 34, 36 that diverge from one another along at least a portion of the distance from the tow arm member 32 to the location of an upper end or end portion 38 of a trailer frame and in this example an upper end portion of an upper trailer body portion or section 40. The term "tow arm" is not limited to a single member such as a tubular member as the term "tow arm" refers to the structure (typically not including the hitch or hitch mount) used in towing the trailer frame. Thus, in the FIG. 1 example, the tow arm includes components 32, 34 and 36. A tow arm can be, for example, a plural component structure. Upper trailer portion or section 40 in this example comprises first and second spaced apart side frame elements 50, 52 that are interconnected intermediate to their respective ends by a cross frame member 54. A first hinge 60 pivotally couples a distal or lower end portion of towing leg 34 to an upper end portion of frame element 50. A second hinge 62 pivotally couples the distal or lower end portion of towing leg 36 to an upper end portion of frame element 52. The hinges 60, 62 thus comprise exemplary tow arm hinges that are desirably positioned in a transverse line. In the embodiment of FIG. 1, the hinges 60, 62 pivotally couple the towing structure including the tow arm member 32 to the upper trailer frame portion for pivoting of the tow arm about a transverse pivot axis. The hinges 60, 62 define a tow arm pivot axis that, in the FIG. 1 example, is about one-third of the distance from the distal end 31 of tow arm member 32 to the bottom or lower end 89 of a lower trailer portion or section 90, described below. The hinges 60, 62 in one desirable form can be selectively locked in place to establish the angle between the towing leg 36 and frame element 50 and between towing leg 34 and frame element 52. This angle is indicated as a (alpha) in FIG. 5. The angle α can be varied, such as to provide clearance C between the upper portion of the wheel (or fender or other bicycle structure) and the trailer towing and trailer frame components. For a trailer coupled to a bicycle seat post or to a rack or mount below and behind the bicycle seat, an angle α of 135 degrees is desirable, with a desirable range of angles for a being between 125 degrees and 145 degrees. A suitable locking mechanism can be used to selectively prevent movement of the tow arm hinges 60, 62 and to establish the desired angle. One or both of the hinges 60, 62 can comprise a lock that can be selectively activated by a lock actuator to lock or release the hinges 60, 62 against pivoting movement. A lock actuator such as a tow arm release mechanism is desirably provided to selectively permit the release of the hinges 60, 62 to permit folding of the towing components against the frame components to a tow arm stowed position, such as explained below, and to permit extension of the towing components from a stowed position to a tow arm towing position. Various release mechanisms can be used, such as intermeshing détente mechanisms, spring biased pin mechanisms, or the like.

One desirable release mechanism is a dual actuated mechanism described in greater detail below in connection with FIG. 31. In general, this dual actuated mechanism is indicated at 70 in FIG. 1 and can comprise a first tow arm actuator, such as a central handle release 72, and additional actuators, such as first and second push button releases 74, 76. Alternatively, only the common actuator operable to simultaneously release or lock tow arm hinge locks can be used. As another less desirable alternative, only separate hinge lock actuators, such as push button actuators, can be used without the common tow arm release actuator. Handle 72 in one embodiment can be actuated using one hand by simply twisting the handle about a transverse axis between the frame components 50, 52 and 34, 36 to release the respective hinges 60, 62. Handle 72 in this embodiment is operatively connected to both hinge locks, for example, by first elongated tensioning members such as actuating cables. Twisting the handle pulls the cables inwardly, and pulls each of first and second hinge locks (associated respectively with hinge 60 and hinge 62) inwardly, decoupling outer hinge components from inner hinge components and allowing them to rotate or pivot relative to one another. Alternatively, the hinge locks 74, 76 in this embodiment can be simultaneously actuated manually, for example, by push button actuators at the lateral faces of the hinge assemblies to permit folding of the towing and upper frame components relative to one another. When folded, as shown in FIG. 6 and in other Figures discussed below, handle 72 can be positioned at an upper portion of the frame with the tow arm stowed so that the handle is in a position for use to push the trailer by hand, to pull the trailer, or in effect to operate the trailer as a hand or luggage cart.

A lower frame portion or section 90 is also shown in the embodiment of FIG. 1. Frame portion 90 can comprise first and second lower spaced apart side frame members 92, 94. Frame member 92 has an upper end portion that is coupled by a hinge 100 to a lower end portion of the frame component 50. Frame member 94 has an upper end portion that is coupled to a lower end portion of the frame component 52 by a hinge 102. Hinges 100, 102 comprise intermediate frame hinges in that they are positioned between upper and lower frame portions or sections 40, 90. Desirably, hinges 100, 102 are positioned along a transverse line that is approximately one-third of the distance from the bottom of the lower frame portion 90 to the end of the tow bar 32. A frame cross member can also extend between hinges 100, 102. Hinges 100, 102 define a transverse axis about which the upper and lower frame portions or sections can be folded or pivoted relative to one another to further collapse the trailer. The hinges, 100, 102, can be locked in place to establish a relative angle [see angle β (beta) in FIG. 5] between frame components 50 and 92 and between frame components 52 and 94. Angle β can be varied to establish clearance (see clearance D in FIG. 5) between the rear wheel of the bicycle as well as other bicycle structures (e.g., a fender) and the trailer frame components. Although β can be varied and is not a critical angle, 170 degrees is a specific example thereof. A release mechanism can be provided to selectively release the hinges 100, 102 to permit folding of the upper and lower frame components 40, 90 relative to one another. Release mechanisms, such as described above for releasing hinges 60, 62, can be used. Thus, for example, in addition to or as an alternative to other release mechanisms, a dual actuating release can be used with a central handle 120 that can be twisted or pivoted, for example in one embodiment by one hand of a user, in one actuating mode to simultaneously release the hinges 100, 102. Alternatively or additionally, respective hinge releases such as push button releases 122, 124 can be actuated (e.g., depressed) to release the respective hinges 100, 102.

A lower load carrying support portion or shelf 140 can also be included in the bicycle trailer. In the FIG. 1 example, support portion or shelf 140 comprises a generally "U" shaped platform frame comprising first and second leg portions 142, 144 and a cross member portion 146. A first end portion of support leg 142, spaced from cross member 146, can be coupled to the lower end of frame member or portion 92, or to a cross member or other structure of the frame. The end portion of support leg 144, spaced from cross member 146, can similarly be coupled to the lower end of frame member or portion 94, or to a cross member or other support structure. Respective hinges 150, 152 are desirably used to couple the support 140, and more specifically the respective legs 142, 144, to the trailer so as to permit collapsing or folding of the support structure, such as about a transverse shelf pivot axis and toward the lower frame portion 90. Less desirably, the shelf can be in a fixed position or eliminated. Hinges 150, 152 are desirably provided with a lock and release mechanism that can be actuated to permit the relative folding of these components. When unfolded as shown in FIG. 1, the support structure 140 in one embodiment can be locked or retained, such as by limit stops or hinge locks (not shown), at a desirable angle, such as γ (gamma) shown in FIG. 5. The angle γ can be varied, with 90 degrees being one illustrative example. A release mechanism is desirably provided to permit selective releasing of the lower shelf hinges 150 and 152 and folding of the support or shelf structure 140 toward the frame body portion 90. Release mechanisms such as described above can be used. Alternatively, a tension application mechanism, such as, a cable release mechanism as described below, can be coupled to each of the lower hinge locks such that, when actuated, the cable release mechanism (which, in an alternative form, be an elongated release other than a cable release) releases the shelf locks to permit folding of the lower support. A prop or stand, such as a kick stand 160 pivoted to cross member 146, can be coupled to the cable so as to operate as an actuator. Pivoting of the stand or prop 160 can actuate the release by causing the cable to release the hinges 150, 152 and permit folding of the support structure 140 against the lower frame 90. The details of exemplary cable based release mechanisms are described below in connection with FIGS. 34-38. Alternatively, the cable release (see FIG. 1) can be coupled to the trailer without engaging the prop 160 for actuation by pulling on the shelf release cable.

Trailer wheels 164, 166 are pivoted to the frame for pivoting about a transverse axis which desirably passes through a cross member or axle at the lower ends of the frame side elements 90, 92. The wheels can be detachably mounted to the frame, such as using a conventional ball lock release mechanism. This allows the wheels to be detached from the frame and stored (such as between the support 150 and lower frame components 90 when the support is folded toward the lower frame components or inserted into wheel retainers such as into openings through wheel receiving ears or flanges 721, 721A (FIG. 34) for storage. An example of a suitable detachable wheel coupler is disclosed in U.S. Pat. No. 3,596,554.

A skin 170 is desirably attached to the frame components to provide a load supporting surface and to also protect any load (e.g., luggage such as carrying bags, duffle bags or the like) carried by the trailer from spray and dirt kicked up by the wheel 12 as it revolves. Durable materials, such as fabric, can be used for the skin 170. A particularly desirable material is a polymer with low density polyethylene of the type conventionally used in snow shoes being an example. In FIG. 1, the skin 170 is shown terminating below the handle 72, and thus below the hinges 60, 62. Consequently, the skin does not interfere with the operation of these hinges. Respective skin cutouts 174, 176 are provided in the skin adjacent to the hinges 100, 102 to provide clearance for folding of the frame at these locations and without interference by the skin. Cutouts can also be used if the skin is extended above the hinges 60, 62. In addition, a central cutout 178 is provided in a position overlying the handle 120 to provide access to the handle through the cutout 178. A flexible cover (not shown) can also be provided to block the rear side of any opening in the skin that accommodates release actuating handle 120.

A plurality of load tie downs, such as attachment mounts or attachment projections can be provided in the illustrated embodiment of a trailer. Other tie down or mounting mechanisms can be used, but the mechanisms shown in FIG. 1 are desirable. As shown in FIG. 3 (see also FIGS. 15 and 16), an exemplary tie down mount or luggage connector 190 comprises a head portion 196 of enlarged cross sectional dimension, such as being of a circular cross section, together with a shank portion 198 of a reduced cross sectional dimension, such as of a reduced diameter. Luggage to frame connectors can interfit with these tie downs or luggage connectors 190 to securely and detachably mount the luggage, such as containers or bags, to the frame. In general, exemplary frame connectors can comprise a body with a first opening of sufficient cross sectional dimension to fit over the head 196 of the projection 190 in combination with a slot portion of a reduced cross sectional dimension positioned to receive the shank portion 198 of the luggage connector when the frame connector is positioned in place. Tension on the frame connectors, such as due to the weight of the luggage, maintains the shank portion in the connector slot and prevents the luggage to frame connector from separating from the projection at undesirable times. The tie down members 190 can be fastened in place using rivets, although bolts or other forms of fasteners, or securing approaches (e.g., welding) can be used. Desirably, plural rows of vertically spaced apart luggage connectors 190 are provided on the trailer frame components. For example, in FIG. 1, four rows of the tie downs, each having two luggage connectors 190, are provided with the luggage connectors of each row being positioned at opposite sides of the trailer frame.

Plural interchangeable luggage items can be provided with frame connectors for selective mounting to the frame mounted luggage connectors.

An exemplary hitch is shown in FIG. 2 that can be coupled to the bicycle by a hitch mount. On form of a hitch mount comprises a seat post clamp 210 comprising first and second clamp sections 212, 214 designed to be fastened together, such as by threaded fasteners 216, 218, to secure the clamp to the seat post 16. Clamp section 214 can comprise a rearwardly extending support or platform portion 224 to which an upright pin 226 can be mounted, such as to an upper surface of the platform. The illustrated hitch comprises a coupler 230 that comprises a first opening 234 extending through the coupler from the bottom to the top thereof and in a position to receive the pin 226 when the trailer hitch is mounted to the hitch mount or clamp. The coupler 230 can be coupled to the tow arm member 32. For example, a second end portion of the coupler 230 (not visible in FIG. 2) can extend inwardly into an adjacent (hollow) end of tow arm member 32 and can be secured to the tow arm member by a fastener 240, such as a bolt and associated nut. A retainer 244, which can comprise a spring element, is positioned above the upper surface of the coupler 230 to retain the coupler on the pin after it has been placed thereon. Retainer 244 can be moved to provide clearance to permit the positioning of the coupler on, and removal of the coupler from, the pin when desired. If the bicycle is traveling in a straight direction down a roadway, as indicated by the number 250 in FIG. 2, with this hitch assembly the trailer also travels straight and a vertical plane through the longitudinal center line of the trailer is aligned with the direction 250 of travel of the bicycle.

Desirably, the hitch of FIG. 2 is comprised of a coupler 230 that tortionally resists any twisting of the tow bar as a trailer is towed. For example, if the right wheel of the trailer of FIG. 1 raises up relative to the left wheel (e.g., because it hits a bump in the road or changes elevation relative to the left wheel), the coupler 230 provides a torsional force that tends to urge the right wheel of the trailer back down to resist potential tipping of the trailer caused by the wheel lifting. In a desirable embodiment, the greater the twisting, the greater the opposed torsional force. That is, in a desirable example, the resistance to twisting progressively increases with the amount of twisting at a rate of from about 0.75 to 2.1 inch lbs per degree with a more specifically desirable example being 1.8 inch lbs per degree. In a specific example, coupler 230 comprises a polymer material, and more desirable polyester having a Durometer of from 45 to 65 on the Shore D scale, with a Durometer of 55D being a particular desirable example for a coupler having a spacing between connector 240 and pin 226 of about thirty millimeters. With this construction, in response to any rolling of the trailer, the coupling 230 twists and counters the rolling. This hitch system or hitch assembly may be used as a sole means of providing stability or less desirably in combination with hard stops. This should be contrasted to hitches with rigid mechanical connections and stops that create hard limits to the twisting of a coupler, which can actually add to the instability of the trailer, particularly when the trailer is being towed by a hitch connected to a bicycle at a location above the wheel 12. Additional information concerning exemplary hitch constructions is found below in connection with the description of FIGS. 18-30. Although less desirable, other alternative forms of hitches can be used, (e.g., with or without flex couplings) for bicycle trailers as disclosed herein.

FIG. 4 is a view of the trailer shown in FIG. 1, looking toward the trailer from a position behind the bicycle. FIG. 5 is a side view of a "skinless" trailer of the FIG. 1 form.

FIG. 6 is a respective rear view of a "skinless" trailer of FIG. 1 with the stand or prop 160 shown in a deployed or down position, and with the towing components 30 shown folded toward the undersurface of the upper portion 40 of the trailer 10. As one can see from FIG. 6, when in this position the trailer frame components 40, 90 can be substantially vertical when supported by prop 160. Prop 160 can have one or more wheels or casters (not shown) at a distal end portion thereof to facilitate wheeling of the trailer when in this position.

FIGS. 7 and 8 illustrate respective front and side views of the trailer of FIG. 1 in a fully collapsed condition, and with the wheels 164, 166 removed and stowed between frame portion 90 and the folded support portion 140. Wheel storing members, such as ears or flanges 721, 721A (FIG. 34) projecting outwardly from the corner regions of support frame member 146 and with respective wheel axle receiving openings can be provided. In such a case, the axles of the removed wheels can respectively be inserted into the respective openings to store the wheels. As another option, the wheels can simply be stored loosely and separately.

Figure 10:
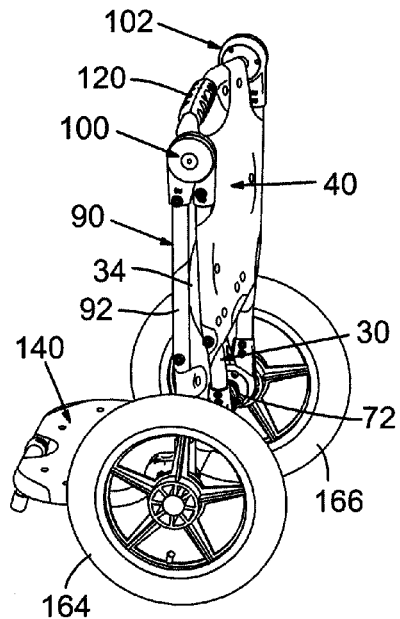
FIG. 10 is a side elevational view of the bicycle trailer of FIG. 9 with both the towing components and articulated frame components in a folded or collapsed condition and with a load supporting shelf deployed. In the FIGS. 9 and 10 conditions, respective handles are available that facilitate the use of the bicycle trailer as a cart.

FIGS. 9 and 10 are additional views of an exemplary embodiment of a trailer with FIG. 9 corresponding to a rear view of the trailer shown in FIG. 1 and FIG. 10 corresponding to the position of the trailer with a shelf 140 deployed and with the tow arm and frame sections in collapsed or stowed positions. In the embodiments of FIG. 9, the skin is comprised of first and second skin sections with the first section being coupled to the upper frame section 40 and the second skin section being coupled to the lower frame section 90. When in the position shown in FIG. 9 or 10, the trailer can easily be used as a stroller or as a luggage cart.

FIG. 11 illustrates a large duffel bag 300 coupled by straps, some being numbered as 302, to the frame of trailer 10. The straps can have frame connectors mounted thereto for connection to luggage connectors of the trailer frame (see FIGS. 15 and 16). FIG. 12 illustrates the trailer of FIG. 11 in an upright position with the trailer being supported by prop 160 in comparison to FIG. 11 wherein the trailer is shown in one position that it can be in when being towed by a bicycle. FIG. 12 illustrates a trailer 10 with upper and lower luggage bags 310, 320 coupled to the trailer, and with the trailer being shown in an upright position. FIG. 13 illustrates yet another configuration of luggage bags 330, 340 coupled to a trailer 10 that is positioned in an upright orientation. FIG. 14 illustrates a bag coupled to the trailer and covered by a rain cover 350. The rain cover 350 can be stored in a pouch 352 coupled to an upper portion of the frame of the trailer, with the rain cover being, for example, withdrawn from the pouch (but optionally remaining connected thereto) to overlie the bag when in use. Interchangeable luggage such as shown in these figures, and variations thereof, can be provided for use with the bicycle trailer.

Figure 15:
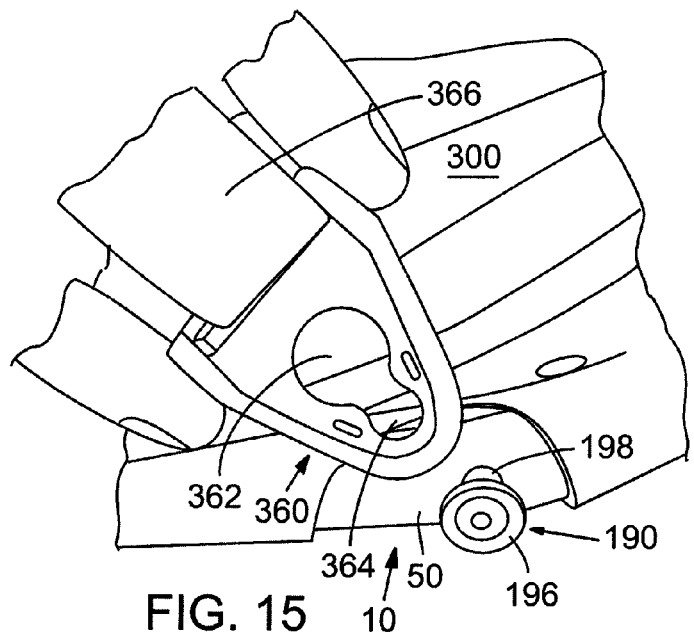
FIG. 15 is a perspective view of one form of a luggage connector or tie down and one form of a luggage to frame connector usable to detachably mount luggage to the frame of the trailer, the connectors being shown in a detached condition.
Figure 16:
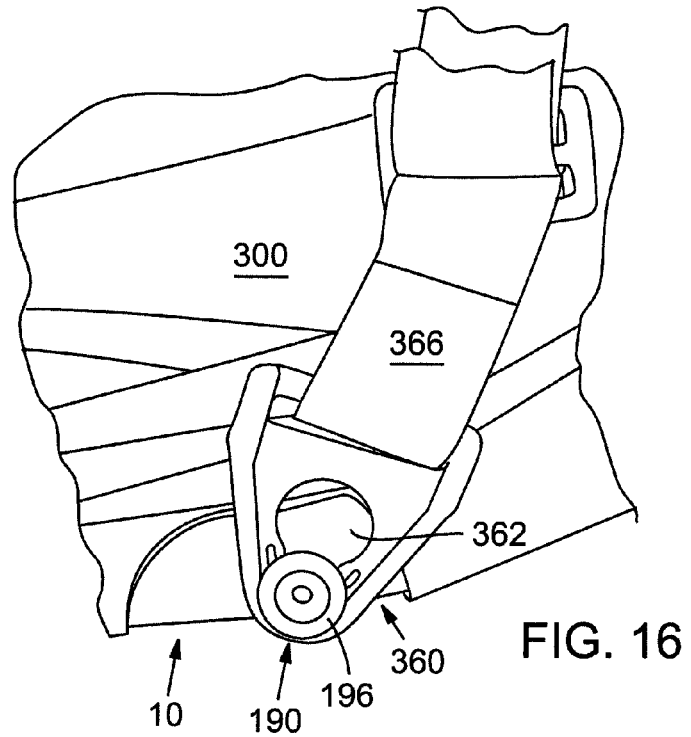
FIG. 16 is a perspective view similar to FIG. 15 with the luggage connector or tie down and luggage to frame connector shown in an attached condition in FIG. 15.

FIGS. 15 and 16 illustrate an exemplary frame connecter 360 that can be used to couple a luggage bag, such as bag 300, to luggage connectors or tie downs 190 of the trailer. In this case, the luggage bag is coupled to frame components of the trailer 10, such as to frame member 50. In the embodiment of FIG. 15, the frame connector 360 is coupled to a strap 366, which in turn is anchored (e.g., by sewing or other fastening methods, or loosely wrapped around the luggage or inserted through luggage loops in the luggage), to the bag 300. The illustrated frame connector comprises a first opening 362, that can be of a generally circular configuration in this example, that is of a first cross sectional dimension. The first cross sectional dimension in this example is greater than the cross sectional dimension of the head 196 of the projection or luggage connector 190. The frame connector 360 also comprises a second opening, such as a slot 364, of a smaller cross sectional dimension than the cross sectional dimension of the opening 362 and that communicates with the first opening. The cross sectional dimension of slot 364 in this example is also less than the cross sectional dimension of the head portion 196 of luggage connector or projection 190, but greater than the cross sectional dimension of the shank portion 198 of the luggage connector 190.

In this example a strap 366 can be pulled in a direction that aligns opening 362 with the head 196 of luggage connector 190. The frame connector 360 can then be placed over the head and pulled to position the shank 198 within slot 364. Tension, such as by gravity due to the weight of the luggage bag 300, retains the frame connector 360 in this position on the associated luggage connector 190 until such time as the tension is relieved and the connector is removed from projection 190. FIG. 16 illustrates the frame connector 360 in a connecting position, with the shank of the luggage connector or projection 190 received within the slot of the frame connector 360. A plurality of these projections 190 can be provided on the upper frame 40 (such as one or more, or the illustrated two on each side of the upper frame portion 40 in spaced apart rows as shown in FIG. 1), one or more projections 190 on each side of the lower frame 90 of the trailer, and one or more projections 190, such as two projections 190, on the support portion 140. By providing luggage with corresponding straps and frame connectors, various bag configurations can be coupled to the trailer in a convenient manner for towing with the trailer when the trailer is moved. Other forms of connectors can alternatively be used. In addition, although less desirable, ropes or other straps can simply be tied to the frame components of the trailer to secure baggage and other loads to the trailer.

Figure 17:
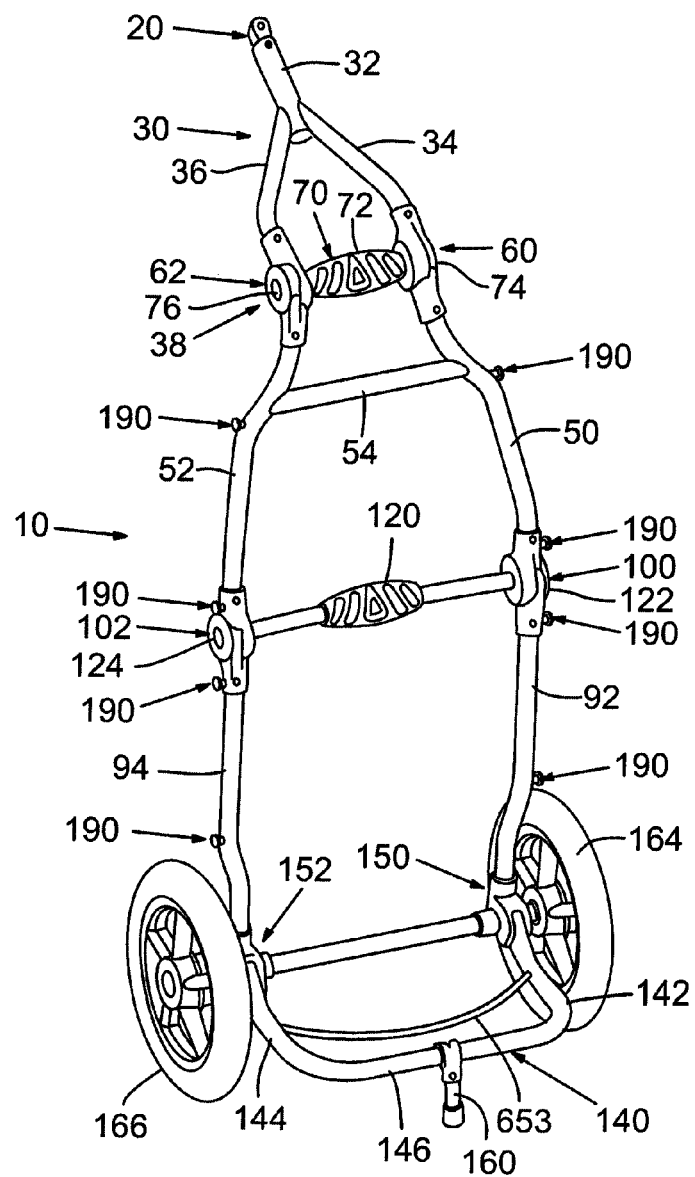
FIG. 17 is a perspective view of an embodiment of a trailer in accordance with this disclosure with the skin or covering of trailer components removed.

FIG. 17 illustrates an exemplary embodiment of a frame for a bicycle trailer without any skin or backing mounted to the frame for convenience in illustrating an exemplary trailer structure. Although less desirable, these figures also illustrate a structure that can be employed in the event a user does not desire the backing or skin material. The backing material can be detachably mounted to the frame (e.g., by hook and eye fabric such as sold under the trademark Velcro) or permanently mounted, such as by rivets, adhesive, or by other types of fasteners, as desired. In the embodiment of FIG. 17, elements in common with the corresponding elements of FIGS. 1-10 are given the same numbers and will not be discussed further.

FIGS. 18-30 illustrate exemplary hitch and hitch mount mechanisms for a trailer of the type shown in FIG. 1. Elements in common with those shown in FIG. 2 have been given the same numbers as in FIG. 2. In some cases a "prime" ['] has been used to indicate a corresponding element having a different configuration from the element shown in FIG. 2, but the lack of a "prime" designation does not mean that the elements are necessarily identical to those shown in FIG. 2.

Figure 18:
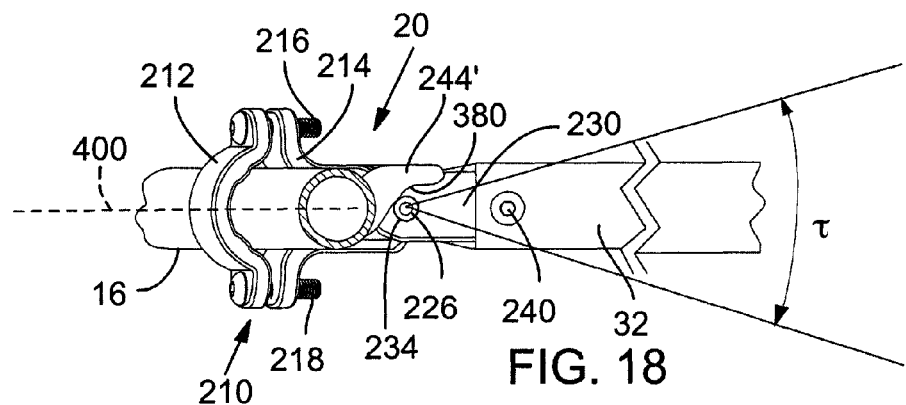
FIGS. 18, 19 and 20 illustrate respective top, side elevation, and forward-looking views of an exemplary trailer hitch that can be used with embodiments of bicycle trailers disclosed herein.
Figure 19:
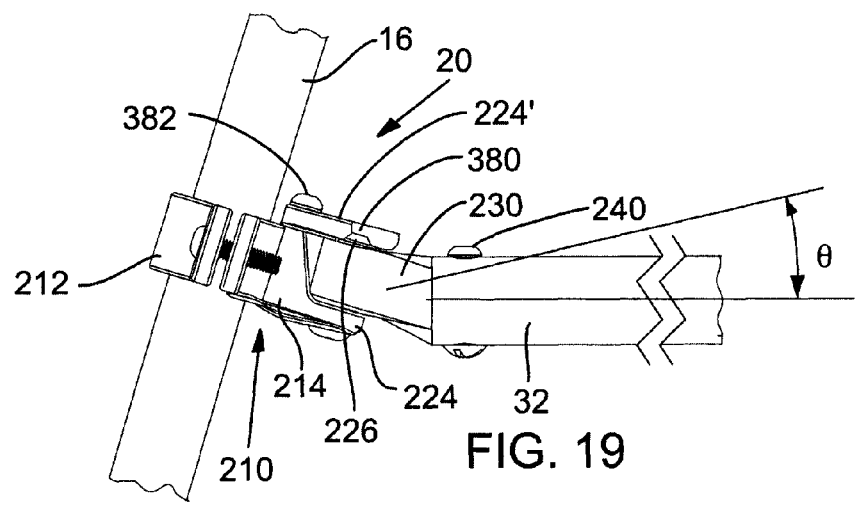
Figure 20:
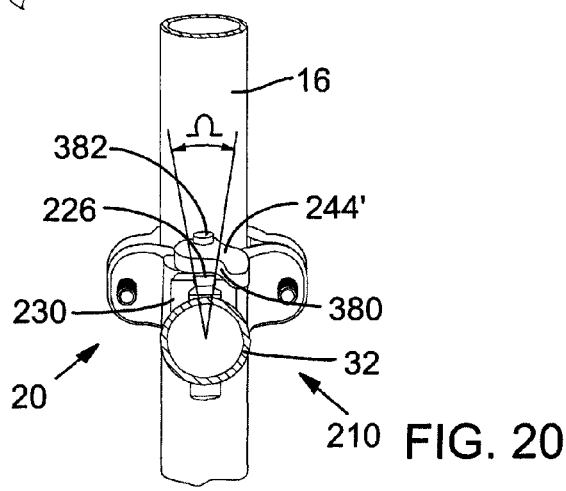

With reference to FIGS. 18-20, a flexible coupling 230 permits the desired motion (steering, pitch and roll) while restricting the range of undesired motion. This can be achieved through the configuration of the pivot axes and fastening points through the coupler and also by selecting material for the coupler that has a desired flex or torsional load resistance. In one specifically desirable example, the coupler 230 is oriented with its long axis approximately parallel to the roll axis of the bicycle. The coupler in one embodiment is permitted to rotate freely about hitch pin 226 to allow unrestricted motion in the steering axis (within limits of the steering capabilities of the bicycle) and also flexes to allow flexible motion in the pitch and roll axes. The coupler 230, in this example, accommodates relative changes in pitch between the bicycle and trailer by bending. The coupler 230 accommodates variations in roll angle between the trailer and bicycle through twisting about its long axis.

Limited motion between the bicycle and trailer in the roll axis is desirable to allow both wheels of the trailer to stay in contact with the ground when the bicycle leans during cornering. Excessive motion in the roll axis is undesirable because the roll axis is the unstable axis of the trailer. Typical lean angles of a bicycle when cornering do not exceed 35° from vertical in either direction. It is desirable to restrict the relative angle between the bicycle and trailer about the roll axis to no more than the angle that the bicycle leans when turning.

The orientation of the coupler 230 allows the resistance to relative roll between the trailer and bicycle to be controlled by specifying or selecting a desirable twist resistance of the coupler 230. Twist resistance of the coupler can be controlled, for example, by varying the durometer of the material that the coupler is made from and or by changing the distance between the coupler mounting holes through which hitch pin 226 and screw 240 pass. As the coupler of the form shown is twisted, the coupler provides progressively increasing resistance to further twisting, avoiding forceful rebound of other systems. In one desirable example, a spring rate of 1.8 inch pounds per degree of rotation allows desirable leaning of the bicycle while restricting excessive rotation of the trailer that would result in unstable motion.

With reference to FIG. 18, a hitch 20 is shown with a coupler 230 having a pin receiving opening 234 aligned with and receiving a generally upright pivot pin 226 projecting upwardly from a platform or base portion 224 (see FIG. 19) of clamp element 214. The pin receiving end portion of the coupler is retained in position by a retainer 244'. In this example, retainer 244' is pivoted by a fastener 382, which may be threaded into, or otherwise secured to, clamping element 214 so as to permit pivoting of retainer 244' about the axis of fastener 382. Fastener 382 may be tightened sufficiently such that pivoting motion of retainer 244' is resisted. The retainer can be pivoted by a user to shift it to an unlocking position to permit removal of the trailer from the clamp. Alternatively, détentes, biasing mechanisms such as springs or elastic, or tie downs can be used as the retainer or to selectively retain the retainer 244' in the locking position.

Figure 24:
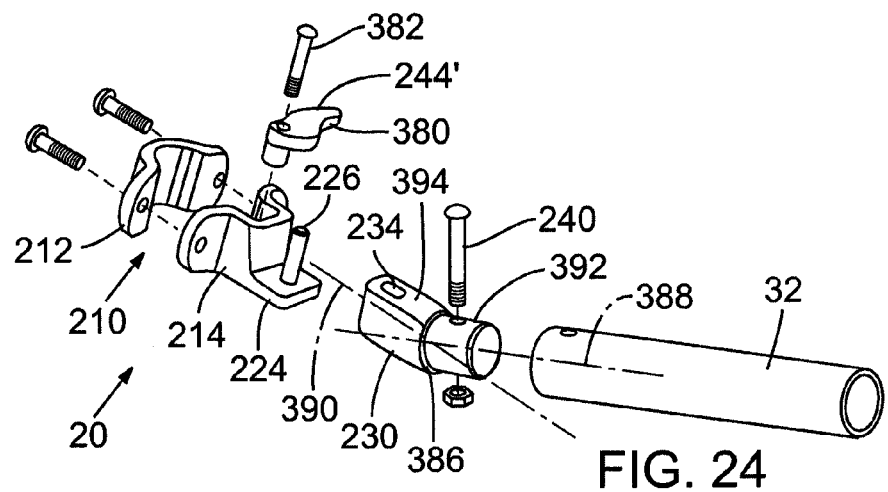
FIG. 24 is an exploded view of the hitch assembly of FIG. 21 and also showing one form of a mount for coupling the hitch to a bicycle.

The pin 226 in this exemplary embodiment allows free pivoting movement of the trailer about the axis of pin 226 in the direction τ (tau) shown in FIG. 18 such that the trailer can pivot about this axial or axis direction as the bicycle is steered. This pivoting movement is unrestricted by the hitch in this example. With reference to FIGS. 19 and 24, the coupler 230 can be angled. A first portion of the coupler (392, FIG. 24) can have an axis (388, FIG. 24) aligned with the longitudinal axis of the tow arm member 32, which can comprise a tube having a hollow end portion that receives the corresponding end portion of the coupler 230. The opposite end of the coupler can be angled upwardly. For example, this end of the coupler can have a longitudinal axis (390, FIG. 24) that is angled upwardly relative to the axis 388 and the axis of the tow arm member 32 such that the opening 234 is aligned with the axis of pin 226. Pitch differences between pin 226 and the trailer can be accommodated by this angled coupler. Alternatively, pitch differences can be accommodated by the flex of the coupling 230.

In addition, the opening 234 through coupler 230 can be elongated in the direction 400 aligned with the longitudinal center line of the bicycle and trailer when the trailer and bicycle are aligned so as to define a pin receiving slot that allows or accommodates pitch differences between a bicycle and trailer. For example, as shown in FIG. 21A, in the fore/aft or longitudinal direction 250, the slot 234 can have wider upper and lower openings and in effect can be deemed to be of an hour glass shape. This shape accommodates relative tilting of the trailer and bicycle in the pitch or θ direction (FIG. 19). In contrast, in the example of FIG. 21B, in a direction transverse or perpendicular to direction 250, the slot 234 can have a dimension that is substantially the same as or slightly greater than the corresponding cross sectional dimension of the pin 226. As a result, the flex coupler twists to resist rolling of the trailer without the pin being allowed to travel any significant distance relative to the slot before torsional resistance to rolling motion of the trailer is applied by the coupler 230. The flexibility of the coupler, the optional use of an angled coupler, and the optional use of an elongated slot, accommodates pitch differences (see angle θ, in FIG. 19) between the tongue of the trailer and the bicycle.

With reference to FIG. 19, it should be noted that retainer 244' can comprise a projecting portion having an arcuate or otherwise shaped cutout portion 380 that permits the retainer 244' to be pivoted to a position overlying the coupler 230 with an edge of the cutout bearing against a side edge of the pin. Alternatively, the pin 234 can be shorter than the coupler so that the retainer 244' can overlie the entire opening 234, if desired. The retainer 244' can be biased, such as by a spring (not shown) to the trailer retention position.

With reference to FIG. 20, the flexible coupling 230 of this example resists twisting in the direction of angle Ω (omega) about the longitudinal axis of the coupler (or the portion of the coupler inserted into or coupled to the trailer tow arm). That is, twisting about an axis aligned with the trailer tow arm member (which corresponds to the direction of travel 400 when the bicycle and trailer are being towed in a straight line) is resisted by the coupler. In a desirable hitch embodiment, the greater the twist out of alignment (the greater the Ω) in either direction, the greater the torsional load applied by the coupler 230 in resistance to the twisting that urges the trailer back to its desired orientation. This progressively increasing torsional load in resistance to twisting in the Ω directions substantially increases the stability of a trailer towed by towing arm coupled to a bicycle at an elevation that is above the rear axle of the vehicle, such as to a seat post or mounting rack at an elevated location of a bicycle frame above the bicycle wheel.

FIGS. 21, 22 and 23 illustrate a trailer hitching sequence. A trailer is shown detached from a bicycle in FIG. 21. The coupler 230 is shown installed on a pin 226 of a mount connected to the seat post of a bicycle in FIG. 22. Finally, the coupler 230 is shown in a fully installed position in FIG. 23 with retainer 244' in the trailer retaining position.

FIG. 24 is an exploded view of the exemplary hitch 20 shown in FIGS. 18-23. In this example, the coupler 230 is provided with a shoulder 386 to limit the extent of insertion of the coupler into a hollow end of the tow arm member 32. In addition, axes 388 and 390 are indicated in this figure. In this example, axes 388 is aligned with the axis of towing arm coupling portion 392 of the coupler and axis 390 is aligned with the longitudinal axis of a pin receiving portion 394 of the coupler. In alternative embodiments, a straight coupler can be used, for example, with or without a shoulder. FIGS. 25, 26, 26A, 26B and 26C illustrate an embodiment with a straight coupler. Elements in FIGS. 25, 26, 26A, 26B and 26C in common with those of the embodiment of FIGS. 18-24 have been assigned the same numbers for convenience.

Figure 25:
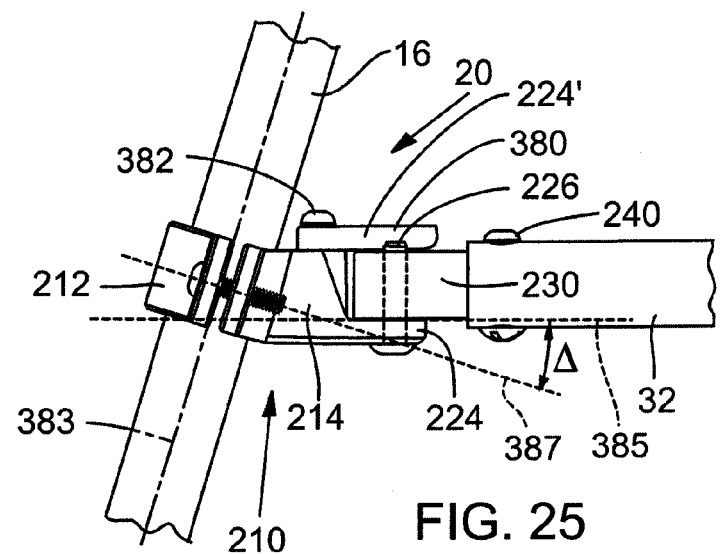
FIG. 25 is a side elevational view of an alternative form of a hitch and hitch mount wherein the mount has a substantially horizontal pin supporting surface portion for supporting a hitch receiving pin thereon.

In the embodiment of FIG. 25, the mount comprises a pin supporting platform 24 from which flex coupler supporting pin 226 extends in an upright, (such as a vertical) direction. The platform 224 in this embodiment is supported to position an upper coupler supporting surface of the platform in a substantially horizontal plane 385. The upper coupler supporting surface is planar in this example. The platform 224 is supported by clamping portion 214 that is angled relative to the longitudinal axis 383 of a bicycle seat post 16, such as by an angle Δ shown in FIG. 25 between a line 387 perpendicular to the seat post axis 383 and the line 385 along the upper surface of the platform 224. This angle is selected or determined so that the upper surface of platform 224 is desirably horizontal when clamp number 214 is mounted to a conventional bicycle seat post. This example facilitates the use of a hitch with a flex coupling lacking the angles shown in the embodiment of FIG. 24 and thus more readily accommodates the use of a straight flex coupling such as shown in FIGS. 26, 26A, 26B and 26C. In addition, the coupling of these latter figures can utilize a right cylindrical opening for receiving pin 226 with the flex coupling accommodating relative pitch changes between the bicycle and towed trailer without utilizing any elongated or hourglass shaped pin receiving slot (although such a slot can be used). The embodiment of FIG. 25 is provided to illustrate yet another exemplary form of flex coupling that can be used.

Figure 26:
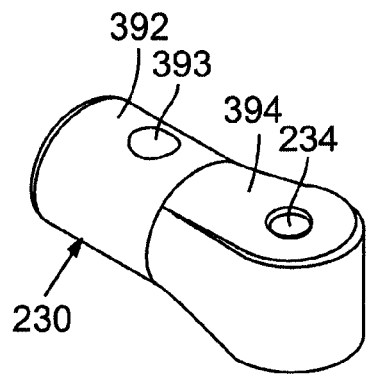
FIGS. 26, 26A, 26B and 26C illustrate respective perspective, top, side elevation and rear views of an exemplary flex coupling usable in the embodiment of FIG. 25.
Figures 26A, 26C:
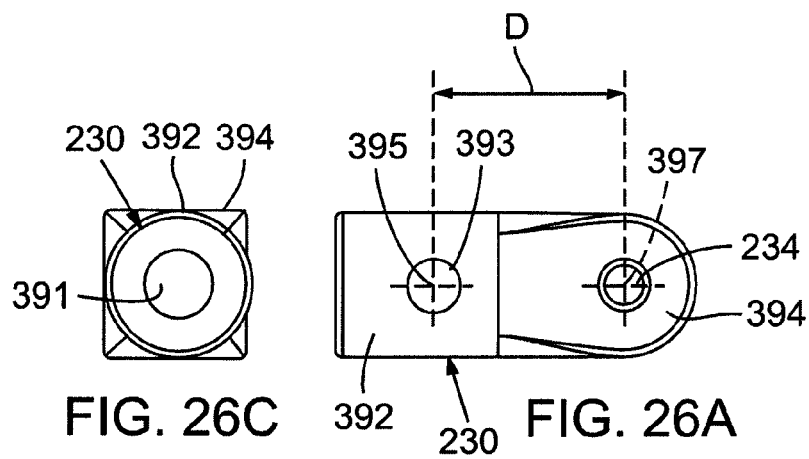
Figure 26B:
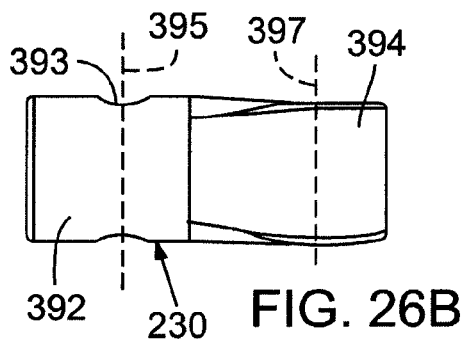

FIGS. 26, 26A, 26B and 26C illustrate this exemplary coupler in greater detail. In this embodiment, the opening through the coupler portion 392 that receives a bolt or fastener 240 (see FIG. 40) is indicated at 393. In addition, the spacing between the center 395 of opening 393 and the center 397 of opening 234 (that receives pin 226 in FIG. 40) is indicated by the letter D. The distance D can be adjusted to vary the torsional force applied by the coupling to resist tipping of the trailer. For a coupler comprising or consisting of polyester having a durometer of 55 on the Shore D scale, an exemplary distance can be about 30 mm to achieve a torsional resistance of about 1.8 inch lbs per degree of rolling or twisting about the longitudinal axis of the coupling. A desirable resistance is from 0.75 inch lbs per degree of rotation to 2.1 inch lbs per degree of rotation. In the embodiment of FIGS. 26, 26A, 26B and 26C, as best seen in FIG. 26C, material can be removed from the coupler, such as by boring a circular bore hole into the coupler base 392, or molding a coupler with the desired quantity of removed material. The amount of torsional resistance provided by the coupler can be controlled by varying the amount of material that is removed.

Figure 27:
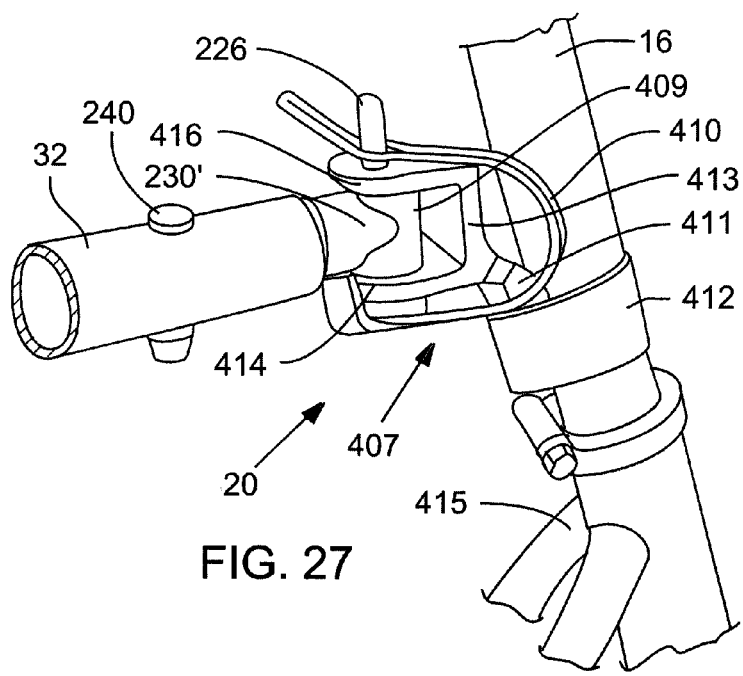
FIG. 27 is a perspective view of an alternative form of hitch and hitch mount.

FIG. 27 illustrates an alternative form of hitch that differs from the hitch shown in FIGS. 18-25. In the embodiment of FIG. 27, the coupler 230' comprises an enlarged end portion 409 having a pin receiving opening extending therethrough in a generally upright orientation. A coupler receiving mount 407 in this embodiment comprises a leg portion 411 mounted, such as by a clamp 412, to the bicycle seat post 16. Alternatively, clamp 412 can couple the mount to a frame portion, such as frame portion 415, of the bicycle. The illustrated mount has a channel defined between lower and upper leg portions 414, 416 of the mount that are separated from one another by a base portion 413 comprising an extension of portion 411. A pin 226 extends through legs 414, 416 and can be selectively retained in place, such as by a removable spring retainer 410. With this construction, twisting of the coupler in the direction of Ω shown in FIG. 36 is resisted by both the resilience of the coupler material 230' and by forces applied by leg portions 414, 416 to the respective lower and upper surfaces of the coupler 230' in response to any such twisting.

Figure 28:
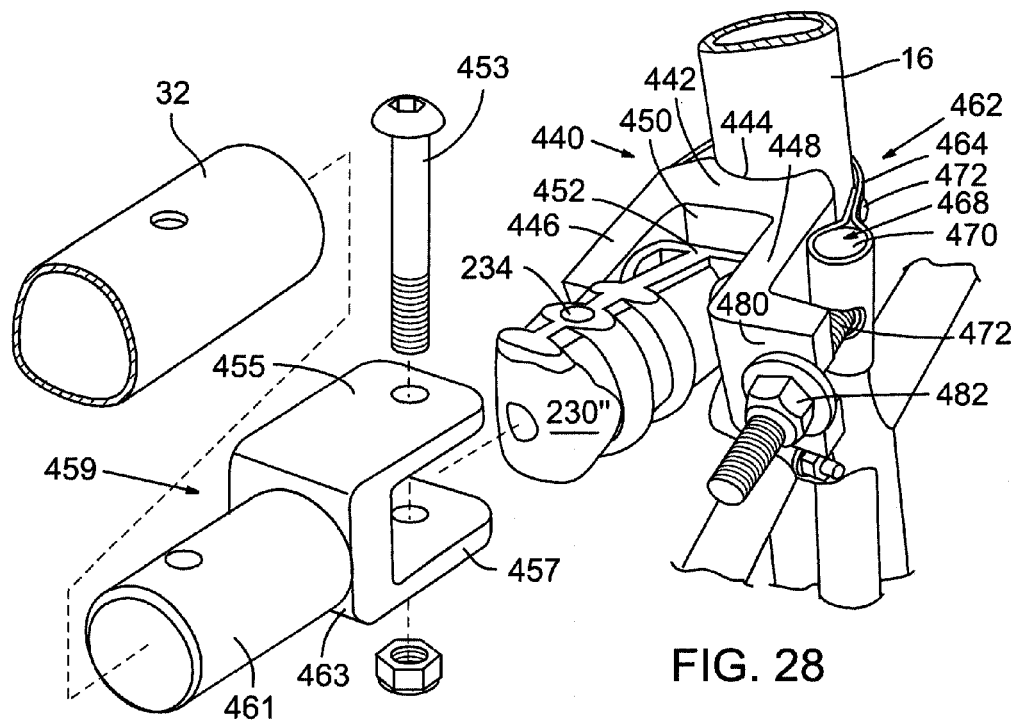
FIGS. 28-30 are respective perspective views of yet another alternative form of hitch and hitch mount that can be used to couple a bicycle trailer to a bicycle.
Figure 29:
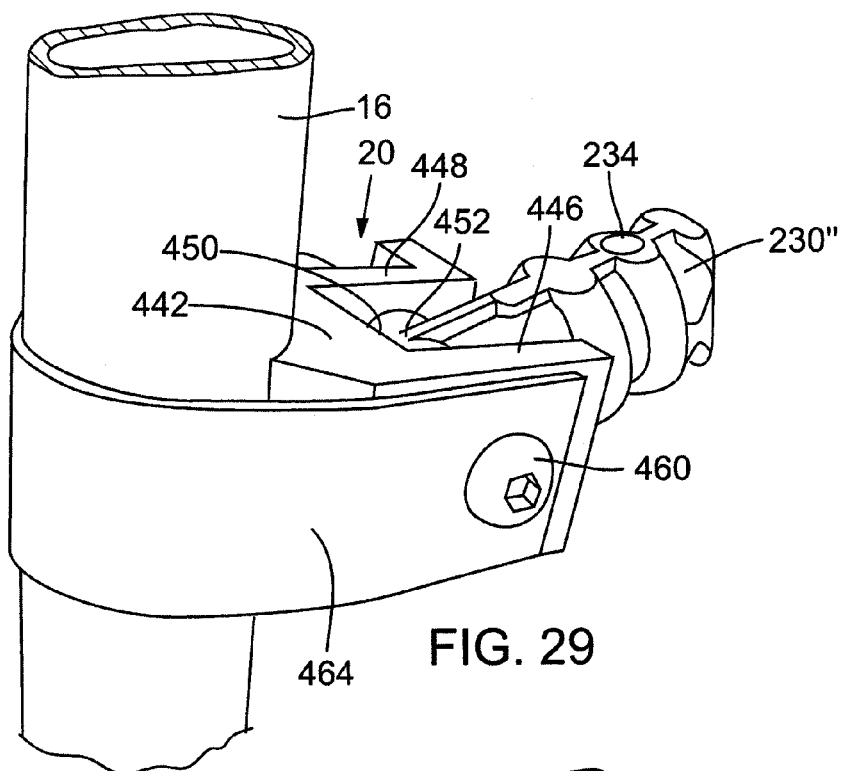
Figure 30:
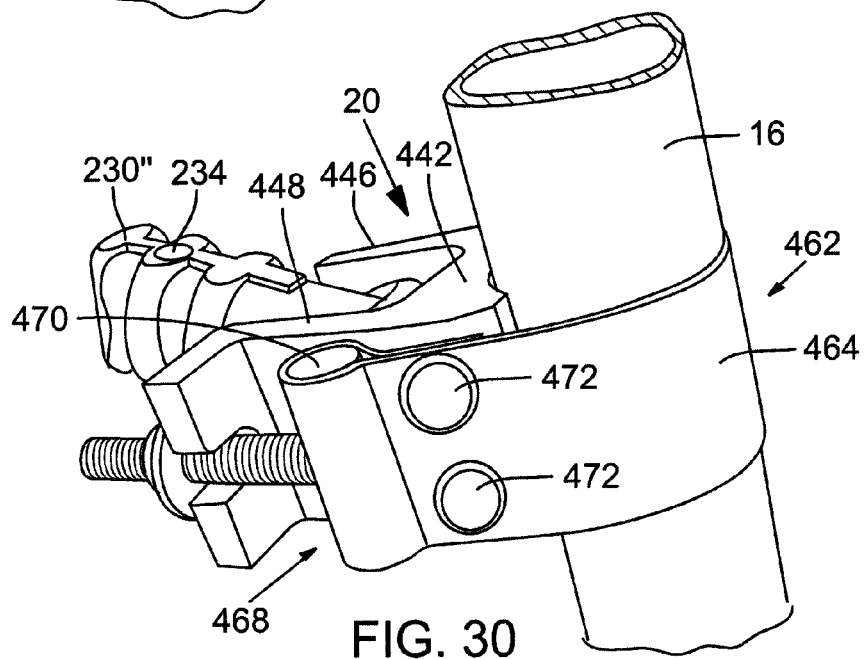

FIGS. 28-30 illustrate yet another embodiment of a hitch that differs from the embodiments disclosed in FIGS. 18-25. In the embodiment of FIGS. 28-30, a coupler mount 440 comprises a base portion 442 having an arcuate surface 444 that is positioned against an adjacent or abutting surface of a seat post 16. Respective spaced apart legs 446, 448 define a channel 450 therebetween into which an enlarged end 452 of a coupler 230" extends. In this embodiment, a generally horizontal pivot axis extends through enlarged end 452 of the coupler and through legs 446, 448. For example, the pivot axis can be defined by a pivot pin 460 (FIG. 29) extending through leg 446, end portion 452 of coupler 230", and through leg portion 448. A clamp 462 holds the mount 440 in place. In this example, clamp 462 comprises a band 464 extending from leg 446, around the seat post 16, and fastened to a tightening mechanism 468. For example, band 464 may be wrapped around a tightening post 470 and secured in position, such as by rivets, one being indicated at 472 in FIG. 28. A threaded bolt 472 is secured to post 470 and passes through a flange extension 480 at the distal end of mount leg 448. A nut 482 engages the free or distal end of bolt 472 and is threaded thereon and tightened to clamp the clamp band 464 against the bicycle seat post 16. This construction is less desirable if unrestricted pivoting in the steering direction is not allowed because the towed trailer is not as free to pivot in the direction of τ shown in FIG. 18. Nevertheless, the hitch still functions as flexing of the coupler 230" allows some movement in the direction of r for steering of the trailer. Motion in the direction θ of FIG. 35 is freely permitted in the structure of FIGS. 28-30 because of the generally horizontal direction of the axis of the pivot pin 460. Again, pivoting in the direction of Ω shown in FIG. 20 is resisted by the coupler as previously explained. In addition, additional resistance to such pivoting arises from forces exerted by the legs 446, 448 against adjoining end surfaces of the enlarged end portion 452 of the coupler in response to twisting in the direction Ω. As an alternative, opening 234A can receive an upright pivot pin 453 with coupler 230" positioned between upper and lower flange 455, 457 of a coupler 459 connected to tow arm member 32. Connector 459 can include a mounting projection 461 extending rearwardly from a base portion 463 of the connector that joins flanges 455, 457. In this construction, the towed trailer is also free to pivot in the steering direction τ about pin 453 (FIG. 18) and can also pivot in the pitch direction θ (FIG. 19) about the axis of pin 460 (FIG. 29).

Figure 31:
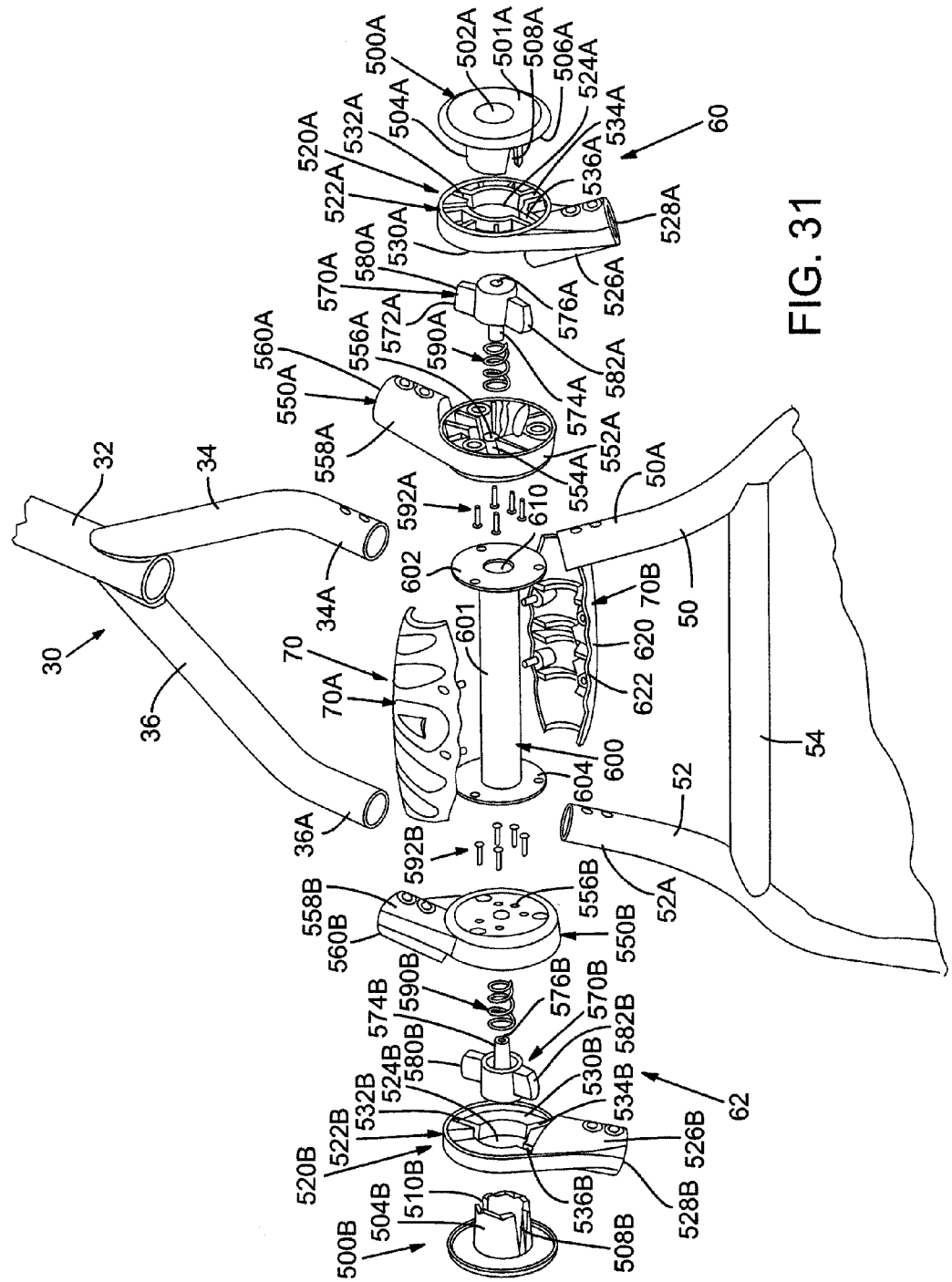
FIG. 31 is an exploded view of one exemplary form of hinges and locking mechanisms that can be used in a bicycle trailer in accordance with this disclosure.

With reference to FIG. 31, exemplary hinge actuators and hinges 60, 62 and 100, 102 are illustrated. Hinges 60 and 62 can be mirror images of one another. In addition, the actuator for hinges 60, 62 and the actuator for hinges 100, 102 can be identical. For these reasons, only the hinges 60, 62 and the actuator for hinges 60 and 62 are described in detail. For convenience, elements in common in these hinges are identified in the figures by the same number, but with the suffix A for components of hinge 60; with the suffix B for components of hinge 62; with the suffix C for components of the hinge 100; and with the suffix D for components of the hinge 102.

With reference to FIG. 31, hinge 60 comprises a hinge cap 500A with an outer face 501A and an opening 502A extending inwardly through the hinge cap. A generally cylindrical projection 504A extends inwardly from the back surface 506A of the hinge cap 500A. The hinge cap 500A is provided with first and second locking member receiving slots, only one of which is shown in FIG. 31 and indicated by the number 508A. However, two such slots 508B and 510B are shown in FIG. 31 in the cylinder 504B of end cap 500B of the hinge 62. Hinge 60 also comprises an outer hinge member 520A comprising a body portion 522A having a central opening 524A through which the end cap 504A is inserted. The outer hinge member 520A also comprises a frame member receiving portion 526A having an opening 528A sized and shaped to receive an upper end portion 50A of side frame member 50. In the same manner, outer hinge portion 520B has a frame receiving portion 526B with an opening 528B sized and shaped to receive an upper end portion 52A of frame member 52. The interior surface 530A of outer hinge member 520A defines lock mating elements, such as locking slots, positioned to selectively lock the towing frame components and intermediate frame components relative to one another at respective folded and towing positions. In FIG. 31, outer hinge member 520B is shown (when in this position) with an upper slot 532B and first and second lower slots 534B and 536B. The positioning of these slots can be varied, together with modifying a locking element, to change the locking positions. More than two locking positions can be included if desired. Similar slots 532A, 534A and 536A are shown in FIG. 31 for outer hinge member 520A.

The illustrated hinge also comprises an inner hinge member 550A comprising a central body portion 552A having a base 554A through which a central opening 556A passes. Hinge portion 550A also comprises a frame receiving portion 558A having an opening 560A sized and shaped to receive a lower end portion 34A of frame member 34. Similarly, a frame receiving portion 558B of inner hinge member 550B has an opening 560B sized and shaped to receive a lower end portion 36A of frame member 36. A hinge lock 570A is also included in the hinge assembly. In the illustrated embodiment, hinge lock 570A comprises a body portion 572A having an inwardly extending stem or projection 574A with an opening 576A extending through body 572A and through the stem 574A. Hinge lock 570A also comprises first and second locking projections such as locking flanges 580A and 582A projecting outwardly from the periphery of lock body 572A. Projections 580A and 582A are radially positioned (such as at predetermined angular positions about the axis about which the hinges 60, 62 pivot) relative to one another about a longitudinal axis through body 572A for alignment with respective slots 532A and either slot 534A or 536A depending upon the rotational position of the locking member 570A. For example, when the towing and intermediate frame components are locked in a towing position, projection 580A is positioned within slot 532A and projection 582A is positioned in slot 536A. In contrast, when the towing frame components and tow arm 30 are folded against the intermediate frame section 40 and locked in this position, locking element 580A is positioned within slot 534A and locking element 582A is positioned in slot 532A. A biasing member, such as a coil spring 590A positioned on stem 574A and bearing against surface 554A of inner hinge member 550A, biases and urges the locking member 570A toward the interior surface 530A of outer hinge 520A and toward the hinge locking position. Hinge elements 550A and 520A can be secured together by fasteners such as 592A. When assembled together, the outer hinge 520A and inner hinge 550A can pivot relative to one another whenever locking member 570A is not in a locked position.

A user can insert his or her finger, or an object, through opening 502A or simply push on a push button defined by end cap 500A to shift locking member 570A away from a locked position to permit relative movement of these hinge members (assuming the user is also shifting the locking member 570B away from its locked position by inserting a finger or other object through the opening 502B in cap 500B or pressing on end cap 500B to depress the locking member 570B. A cross member 600 is provided in this embodiment and can comprise a hollow tube 601, which can be of a right cylindrical configuration with respective end flanges 602 and 604 mounted thereto. Inner hinge member 550A is mounted to flange 602 and inner hinge member 550B is mounted to flange 604 by fasteners (not shown).

Desirably a lock actuator is provided for simultaneously actuating both lock members 570A, 570B without requiring the lock members to be depressed by a user's finger or other object inserted through or using the end caps. In one desirable form, an elongated tensioning member such as a cable (not shown in FIG. 31) can extend through locking member 570A, and more specifically through opening 576A, and through the inner hinge member 550A, and more specifically through opening 556A of the inner hinge member. The cable can also extend through an opening 610 through the center of cross member 601 and exit through the cross member 601 through an opening (not shown in FIG. 31). A similar cable can engage locking member 570B and pass through opening 576B, opening 556B and through an opening through flange 604 to the interior of cross member 601, and exit through an opening (not shown) in the cross member. A latch actuator, in this example comprising a twist grip or handle 70 (also shown in FIG. 1) including a lower portion 70B (FIG. 31) and an upper portion 70A is provided. The twist grip is free to pivot about cross member 601 and thereby, for example, about the transverse axis through the hinges 60, 62. The actuator can alternatively pivot about other axes (such as rotate about an axis that is perpendicular to the transverse axis) or otherwise move to selectively move tensioning members in appropriate directions to release the locks or permit locking of the locks. The aforementioned cables can be secured to the twist grip, for example, by fasteners or a fastening mechanism located in the twist grip portion 70B. When the twist grip portions are assembled onto the cross member 601, pivoting the twist grip draws the cables inwardly and retracts or pulls the respective lock members 570A, 570B against the biasing of the springs 590A, 590B and out of locking engagement with the outer hinge members 520A, 520B. When the twist grip is released, the biasing springs urge the locking members outwardly toward the respective outer hinges where they can again reengage locking slots after the components are folded or unfolded to their desired positions. The operation of these cables and actuator will become more apparent from the drawings below.

In FIG. 32, a continuous cable 605 is shown with stops 607A, 607B at respective ends. The stops can be positioned to engage the locking members 570A, 570B while allowing the locking members to lock the hinge elements against relative pivoting when the handle is in a first position. The cable exits opening openings 609A, 609B from the interior of cross member 601 and into the handle 70. The cable can rest within a channel 611 defined within the handle or otherwise be secured to the handle. To protect the cable, components such as guide tubes 613A, 613B and 615 (comprising Teflon® or other suitable material) can be positioned at locations where the cable is subjected to wear. With this construction, twisting the handle 79 from a first rest position applies tension to both end portions of the cable and withdraws the lock members 570A, 570B against the biasing forces applied by springs 590A, 590B to unlocked positions. Releasing the handle allows the handle to move in the opposite direction with the biasing forces urging the lock members to their locking positions.

FIG. 32 also illustrates a twist grip section 70B with a central channel 644 (a similar channel being provided in twist grip section 70A) within which a guide 645, such as a bolt, screw or pin mounted to cross member 601, is positioned upon assembly of the twist grips. As a result, the guide 645 restricts axial or sliding movement of the actuators 70 along the supporting cross member 601 while permitting rotation of the twist grip about the axis of the cross member. Suitable fasteners, such as bolts or other fasteners, can be used to interconnect the twist grip components.

In the embodiment of FIG. 33, the lower twist grip portion 70B is shown in position on the cross member 601. In this embodiment, the tensioning member comprises an actuating cable comprising first and second cable sections or portions 624A, 624B. FIG. 33 illustrates an end portion of cable 624A secured to twist grip portion 70B by fastener 620A and an end portion of cable 624B secured to twist grip section 70B by fastener 620B. In this example, the fasteners 620A, 620B can comprise bolts or screws. Throughout this entire disclosure, the referenced fasteners can be of any suitable type and are not limited to the described examples.

When twist grip 70 is rotated, the cables draw the lock members 270A, 270B inwardly to release the lock members to permit movement of the frame and tow arm components relative to one another. FIG. 1 illustrates the hinges 60, 62, 100 and 102 in an assembled state with their respective latch actuators 70 (for hinges 60, 62) and 120 (for hinges 100, 102). Pivoting of twist grip 120, assuming the same actuator is used as described in connection with actuator 70, operates in the same manner to lock and unlock hinges 100, 102 to permit and prevent relative pivoting of the upper end lower frame sections. Hinges 100, 102 can also incorporate push button actuated locking/unlocking mechanisms operable independently of the actuator 120 and of one another, as explained above for the tow arm to frame locking/unlocking mechanism.

Other forms of locking/unlocking mechanisms can be used. For example, less desirably either the individual hinge locking/unlocking mechanisms or the common hinge locking/unlocking mechanism that simultaneously unlocks both hinges can be eliminated. Single pin locks or stops can also be used, but these are less desirable.

Support structure 140 and an exemplary actuator therefore, in an embodiment wherein the support structure is not fixed (although it could be in a fixed position) is shown in FIGS. 34-38. With reference to FIGS. 34-38, a lower support structure 140 is illustrated. A prop or leg 160 has a cushion 650 coupled to one end portion thereof. A coupler 652 is shown that can have a first opening 654 for receiving the end of leg 160 opposite to the cushioned end. The coupler 652 also comprises a mounting portion 656 having an opening 658 through which a cross bar or cross member 146 of the support structure can be passed to mount the coupler and leg 160 to the support structure. A bolt, pin or other fastener 660 can be used to fasten coupler 652 to the leg 160. The coupler also can comprise an arcuate groove 668 communicating with passageway 658 and extending partially about the longitudinal axis of passageway 658 for engaging a guide, as explained below, to allow rotation or pivoting of the leg 160 relative to cross member 146 while preventing the leg from shifting axially along the cross member.

Figure 34:
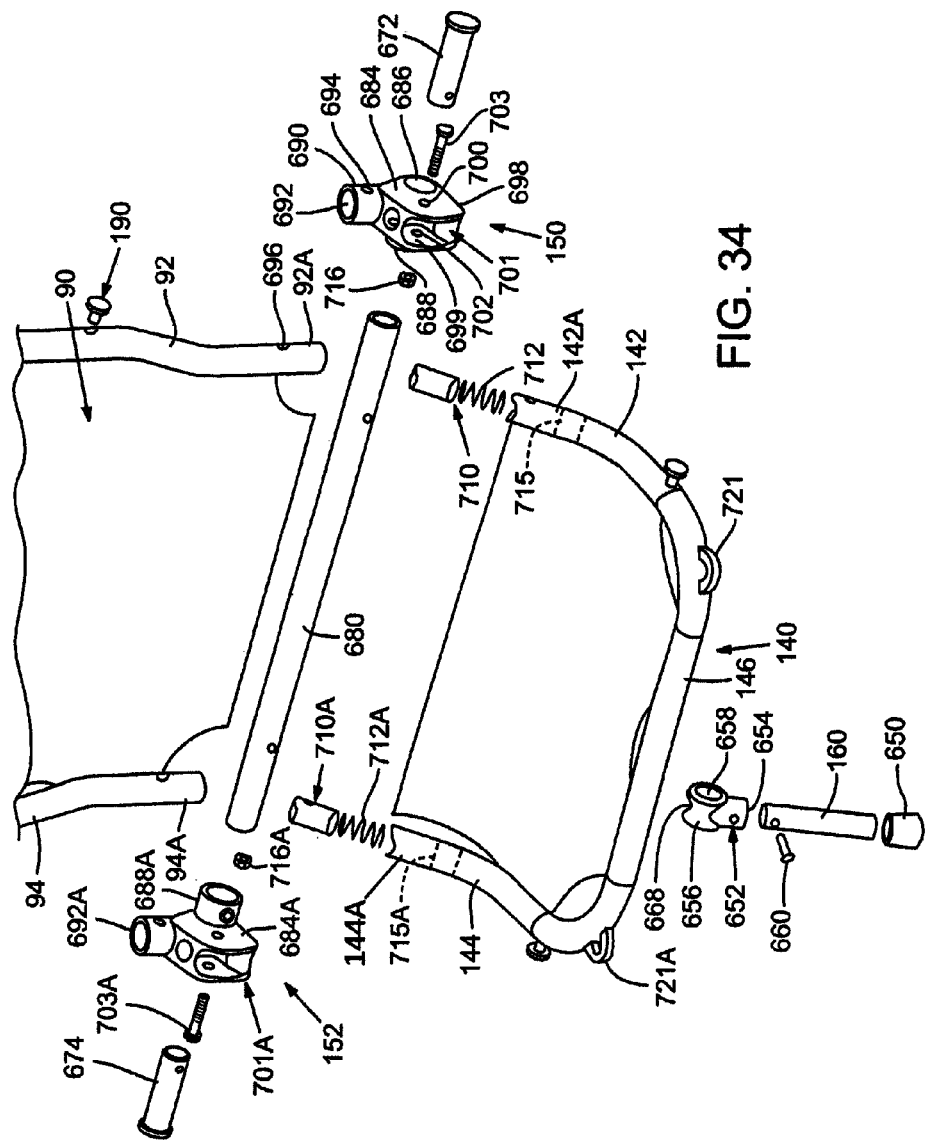
FIG. 34 is an exploded view of an exemplary support or shelf portion of a bicycle trailer that can be used in a trailer in accordance with this disclosure.

A wheel pin or axle receiving cross piece 680 is also shown in FIG. 34. Cross piece 680 can be hollow so as to receive axle supporting end pieces 672, 674 in the respective ends thereof. The end pieces can be configured to receive wheel supporting stub axles.

The illustrated hinge 150 for support structure 146 comprises a body 684 having an opening 686 extending therethrough with a cross member receiving receptacle 688 projecting inwardly from the body and toward the cross member 680 in FIG. 34. The hinge body 684 also comprises an upwardly extending receptacle 690 having an opening 692 configured to receive a lower end portion 92A of frame side member 92. A pin or fastener receiving opening 694 extends through the receptacle 692 and is aligned with an opening 696 through frame end portion 92A when these components are assembled such that a bolt or other fastener can be used to secure the frame member 92 to the hinge 150. The hinge body 684 also comprises first and second spaced apart sidewalls 698, 699 which define an opening 701 therebetween. Opening 701 is generally arcuate in shape and configured so as to receive an upper end portion 142A of support structure leg 142 in a manner that permits the leg 142 to pivot between lowered and collapsed or folded positions. Openings 700, 702 extend through the respective sidewalls 698, 699 and are aligned with one another so as to be adapted to receive a fastener 703, such as a bolt or other fastener, as explained below.

A plunger 710 and biasing spring 712 can be positioned within the end of the end portion 142A. Plunger 710 can have an elongated slot 714A (FIG. 37) extending therethrough. When assembled, the pin 703 can be inserted through opening 700 in wall 698, through the slot 714, and through the opening 702 in wall 699. A retainer, such as a nut 716, can be used to retain these assembled components in place. A tensioning member such as a cable, not shown in FIG. 34, can be coupled to the plunger 710, (such as by a cable stop 713A shown engaged to plunger 710A in FIG. 37) and can pass through the interior of leg 142 and interior of cross member 146, and through an opening (not shown in FIG. 34) in the cross member 146 to the coupler 652. The cable can be connected to the coupler and to the plunger (see FIG. 38) such that pivoting of the coupler 652, by pivoting prop 160, from a folded to an extended position tightens the cable and moves or shifts the plunger further into the end 142A of leg 142. The spring 712A resists this motion and is backed by a stop 715A press fit or otherwise mounted within leg 144. This movement of the plunger releases the plunger from one of plural cavities, such as détente recesses (752, 764 in FIG. 37), of body 684 so as to permit movement of the structure 140 between a folded or collapsed position and an extended position and vice versa.

Alternatively, an actuating cable, such as in the form of a cable loop 653 extending partially through legs 142, 144 and across the underside of the support or shelf can be used to actuate the shelf releases. The cable loop can be loosely retained (e.g., by a fold of the skin of the trailer) at the underside of the shelf. In this case, tensioning the cable loop actuates the plungers to release the shelf locks. The shelf lock can be constructed in an alternative form to lock the shelf in only one of the two positions (up or down). Less desirably, the shelf lock can be eliminated and one or more stops used to limit the downward movement of the shelf. Hinge 152 can be the mirror image of hinge 150. Consequently, hinge 152 will not be discussed in detail. The suffix A has been used for elements of hinge 152 that correspond to elements of hinge 150. For example, a frame receiver 692A of hinge 152 corresponds to element 692 of hinge 150 and can be configured to receive a lower end portion 94A of frame member 94. In addition, the same suffix A is used for components of the plunger assembly for hinge 152A that are in common with the components for hinge 150.

Figure 38:
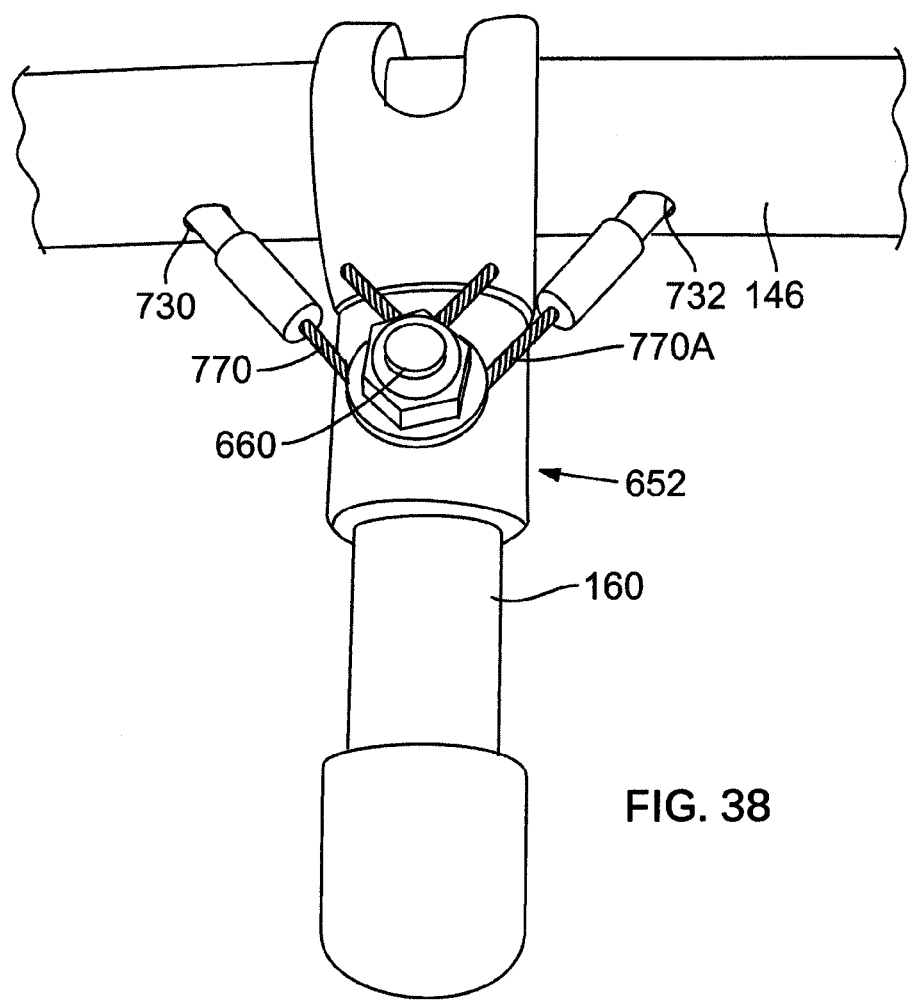
FIG. 38 is a perspective view of an exemplary prop or support actuated release mechanism for releasing the lower shelf to permit folding of the lower shelf.

With reference to FIG. 38, first and second openings 730, 732 through cross member 146 are shown. Plunger actuating cables controlled by prop 160 pass through these respective openings to the respective plungers, as will become more apparent below. With reference to FIGS. 36 and 37, a cable 750 is shown coupled to plunger 710A. The cable is shown in its untensioned condition so as to allow the end of the plunger 710A to engage a recess 752A defined in the interior of hinge body 684A so that the arm 144 and the shelf structure 140 is retained in its locked and lowered position. Tensioning of cable 750 withdraws plunger 710A from recess 752A, which allows arm 144 and the shelf structure 140 to pivot counterclockwise in FIG. 36 (in the direction indicated by arrow 760) to allow folding of the shelf structure 140 against the lower frame section of the trailer. When in its folded position, and upon relaxing the tension on cable 750, the end of plunger 710A is urged by biasing spring 712A into a cavity such as a recess or détente 764A so that the arm 144 and shelf structure 140 is held in its collapsed folded position until the plunger is again moved to permit motion of the shelf structure 140.

The prop 160 if coupled to a plunger actuating cable or cable sections or to the cable loop desirably operates to simultaneously unlock both of the shelf hinges 150, 152 if two such locking hinges are used. Cable guides (e.g., sleeves) can guide the cables where they pass through restricted passageways, such as openings through shelf components (e.g., openings 730, 732 in FIG. 38). The cable guides can be threaded to or otherwise be coupled to the cables.

The stops 715, 715A (FIG. 34), for respective insertion into shelf leg end portions 142A and 144A, are shown in dashed lines in FIG. 34. These stops can friction-fit or otherwise be positioned and mounted within the receiving end portions to provide a backstop for the base of the respective springs 712, 712A. The shelf actuating cables can be fed through an opening through these stops.

FIG. 37 illustrates the position of cable stop 713A within a stop receiving opening provided in the base of the plunger 710A. A slot communicates from the stop receiving opening through the bottom of the plunger and to one side of the plunger to permit insertion of the cable therein when the stop 713A is positioned within the stop receiving opening.

It should be noted in the embodiments illustrated above, the frame components are shown as tubular, a desirable construction. These components may be of circular, rectangular, square or other cross section. A tubular construction reduces the weight of the trailer and is therefore desirable, but is not required. Typically the frame components are made of a lightweight durable material such as aluminum, although other durable materials, including, but not limited to, steel and carbon reinforced fiberglass, can be used.

Having illustrated and described the principles of our invention with reference to a number of exemplary embodiments, it should be apparent to those of ordinary skill in the art that these embodiments may be modified in arrangement and detail without departing from the inventive concepts disclosed herein. We claim all such modifications that fall within the scope of the following claims.

We claim:

1. A bicycle trailer for a bicycle comprising:
    a frame comprising an upper portion and a lower portion, the upper portion and lower portion being pivoted together so as to be foldable;
    first and second wheels for coupling to the lower portion of the frame;
    a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;
    a hitch coupled to the tow arm for detachably coupling the tow arm to the bicycle when the tow arm is in the towing position;
    a tow arm lock operable in a tow arm lock locking position to prevent pivoting motion of the tow arm relative to the frame and in a tow arm lock release position to allow pivoting motion of the tow arm relative to the frame; and
    a tow arm lock actuator coupled to the tow arm lock and operable to selectively shift the tow arm lock between the tow arm lock locking position and the tow arm lock release position.

2. A bicycle trailer according to claim 1 wherein the tow arm comprises a distal end portion and a second frame coupling portion pivoted to the upper portion of the frame, the hitch being mounted to the distal end portion of the tow arm, a frame lock operable in a frame lock locking position to prevent folding of the upper portion of the frame relative to the lower portion of the frame and in a frame lock release position to allow folding of the upper portion of the frame relative to the lower portion of the frame, and a frame lock actuator coupled to the frame lock and operable to selectively shift the frame lock between the frame lock locking position and the frame lock release position.

3. A bicycle trailer for a bicycle comprising:
    a frame comprising an upper portion and a lower portion;
    first and second wheels for coupling to the lower portion of the frame;

a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;

a hitch coupled to the tow arm for detachably coupling the tow arm to the bicycle when the tow arm is in the towing position;

a tow arm lock operable in a tow arm lock locking position to prevent pivoting motion of the tow arm relative to the frame and in a tow arm lock release position to allow pivoting motion of the tow arm relative to the frame;

a tow arm lock actuator coupled to the tow arm lock and operable to selectively shift the tow arm lock between the tow arm lock locking position and the tow arm lock release position; and comprising first and second spaced apart tow arm hinges that pivotally couple the tow arm to the upper portion of the frame for pivoting about the transverse axis, the tow arm lock comprising a first tow arm lock member associated with the first tow arm hinge and operable in a tow arm lock locking position to prevent pivoting motion of the tow arm relative to the frame and in a tow arm lock release position to allow pivoting motion of the tow arm relative to the frame, the tow arm lock comprising a second tow arm lock member associated with the second tow arm hinge and operable in a tow arm lock locking position to prevent pivoting motion of the tow arm relative to the frame and in a tow arm lock release position to allow pivoting motion of the tow arm relative to the frame, the tow arm lock actuator comprising at least one common tow arm lock actuator coupled to the first and second tow arm lock members and operable to simultaneously shift the first and second tow arm lock members between their respective tow arm lock locking positions and their respective tow arm lock release positions.

4. A bicycle trailer according to claim 3 wherein the at least one common tow arm lock actuator comprises a first handle pivotally supported for pivoting about a first transverse handle axis, a first elongated tensioning member coupling the first handle to the first tow arm lock and a second elongated tensioning member coupling the first handle to the second tow arm lock, the first handle being operable such that pivoting the first handle in one direction applies tension to the first and second tensioning members and moves the first and second tow arm locks to their respective tow arm lock release positions and such that pivoting the first handle in a direction opposite to said one direction allows the first and second tow arm locks to move from their respective tow arm lock release positions to their respective tow arm lock locking positions, a first tow arm lock biasing member associated with the first tow arm lock and a second tow arm lock biasing member associated with the second tow arm lock, the first and second tow arm lock biasing members biasing the respective first and second tow arm locks to their respective tow arm lock locking positions, and the first handle being positioned adjacent to an upper end of the frame following pivoting of the tow arm to the tow arm stowed position such that the first handle can be used as a handle for the bicycle trailer in a cart mode of operation of the bicycle trailer.

5. A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;

a hitch coupled to the tow arm for detachably coupling the tow arm to the bicycle when the tow arm is in the towing position;

a tow arm lock operable in a tow arm lock locking position to prevent pivoting motion of the tow arm relative to the frame and in a tow arm lock release position to allow pivoting motion of the tow arm relative to the frame;

a tow arm lock actuator coupled to the tow arm lock and operable to selectively shift the tow arm lock between the tow arm lock locking position and the tow arm lock release position; and comprising a first tow arm hinge for coupling a first portion of the tow arm to the frame and a second tow arm hinge for coupling a second portion of a tow arm to the frame, the tow arm lock comprising a first tow arm hinge lock operable to selectively lock the first tow arm hinge to prevent relative pivoting of the tow arm and the frame and operable to selectively unlock the first tow arm hinge to permit relative pivoting of the tow arm and frame, the tow arm lock comprising a second tow arm hinge lock operable to selectively lock the second tow arm hinge to prevent relative pivoting of the tow arm and the frame and operable to selectively unlock the second tow arm hinge to permit relative pivoting of the tow arm and frame, the tow arm lock actuator comprising a first tow arm lock actuator coupled to both of the first and second tow arm hinge locks and operable to selectively unlock both of the first and second tow arm hinge locks upon shifting the first tow arm lock actuator to an unlocking position and operable to selectively lock the first and second tow arm hinge locks upon shifting the first tow arm lock actuator to a second locking position, a second tow arm lock actuator coupled to the first tow arm hinge lock and selectively operable to lock and unlock the first tow arm hinge lock, a third tow arm lock actuator coupled to the second tow arm hinge lock and selectively operable to lock and unlock the second tow arm hinge lock, the second tow arm hinge lock actuator being operable independently of the third tow arm hinge lock actuator and the third tow arm hinge lock actuator being operable independently of the second tow arm hinge lock actuator.

6. A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;

a hitch coupled to the tow arm for detachably coupling the tow arm to the bicycle when the tow arm is in the towing position;

a tow arm lock operable in a tow arm lock locking position to prevent pivoting motion of the tow arm relative to the frame and in a tow arm lock release position to allow pivoting motion of the tow arm relative to the frame;

a tow arm lock actuator coupled to the tow arm lock and operable to selectively shift the tow arm lock between the tow arm lock locking position and the tow arm lock release position; and wherein the frame comprises upper and lower frame sections, the upper frame section being pivotally coupled to the lower frame section for pivoting relative to the lower frame section about a transverse frame pivot axis to permit pivoting of the upper frame section toward the lower frame section to a frame stowed position wherein the upper frame section faces the lower frame section.

7. A bicycle trailer according to claim 6 comprising a frame lock operable in a frame lock locking position to prevent pivoting of the upper frame section about the transverse frame pivot axis relative to the lower frame section and in a frame lock release position to allow pivoting of the upper frame section about the transverse frame pivot axis relative to the lower frame section; and a frame lock actuator coupled to the frame lock and operable to selectively shift the frame lock between the frame lock locking position and the frame lock release position.

8. A bicycle trailer according to claim 7 comprising first and second spaced apart frame hinges that pivotally couple the lower frame section to the upper frame section, the frame lock comprising a first frame lock member associated with the first frame arm hinge and operable in a frame lock locking position to prevent pivoting motion of the upper frame section relative to the lower frame section and in a frame lock release position to allow pivoting motion of the upper frame section relative to the lower frame section, the frame lock comprising a second frame lock member associated with the second frame hinge and operable in a frame lock locking position to prevent pivoting motion of the upper frame section relative to the lower frame section and in a frame lock release position to allow pivoting motion of the upper frame section relative to the lower frame section, the frame lock actuator comprising at least one common frame lock actuator coupled to the first and second frame lock members and operable to simultaneously shift the first and second frame lock members between their respective frame lock locking positions and their respective frame lock release positions.

9. A bicycle trailer according to claim 8 wherein the at least one common frame lock actuator comprises a second handle pivotally supported for pivoting about a second transverse handle axis spaced from the first transverse handle axis, a first elongated tensioning member coupling the second handle to the first frame lock and a second elongated tensioning member coupling the second handle to the second frame lock, the second handle being operable such that pivoting the second handle in one direction applies tension to the first and second tensioning members and moves the first and second frame locks to their respective frame lock release positions and such that pivoting the second handle in a direction opposite to said one direction allows the first and second frame locks to move from their respective frame lock release positions to their respective frame lock locking positions, a first frame lock biasing member associated with the first frame lock and a second frame lock biasing member associated with the second frame lock, the first and second frame lock biasing members biasing the respective first and second frame locks to their respective frame lock locking positions, and the second handle being positioned adjacent to an upper end of the lower frame section following pivoting of the first and second frame sections to the frame stowed position such that the second handle can be used as a handle for the bicycle trailer in a second cart mode of operation of the bicycle trailer wherein the tow arm is positioned in the tow arm stowed position.

10. A bicycle trailer according to claim 7 comprising a first frame hinge for coupling a first portion of the upper frame section to the lower frame section and a second frame hinge for coupling a second portion of the upper frame section to the lower frame section such that the upper and lower frame sections are pivotal about a transverse frame pivot axis, the frame lock comprising a first frame hinge lock operable to selectively lock the first frame hinge to prevent relative pivoting of the upper and lower frame sections and operable to selectively unlock the first frame hinge to permit relative pivoting of the upper and lower frame sections, the frame lock comprising a second frame hinge lock operable to selectively lock the second frame hinge to prevent relative pivoting of the upper and lower frame sections and operable to selectively unlock the second frame hinge to permit relative pivoting of the upper and lower frame sections, the frame lock actuator comprising a first frame lock actuator coupled to both of the first and second frame hinge locks and operable to selectively unlock both of the first and second frame hinge locks upon shifting the first frame lock actuator to an unlocking position and operable to selectively lock the first and second frame hinge locks upon shifting the first frame lock actuator to a second locking position, a second frame lock actuator coupled to the first frame hinge lock and selectively operable to lock and unlock the first frame hinge lock, a third frame lock actuator coupled to the second frame hinge lock and selectively operable to lock and unlock the second frame hinge lock, the second frame hinge lock actuator being operable independently of the third frame hinge lock actuator and the third frame hinge lock actuator being operable independently of the second frame hinge lock actuator.

11. A bicycle trailer according to claim 6 wherein the tow arm has a distal end spaced from the frame and the frame has a lower end, and wherein the transverse tow arm pivot axis is positioned approximately one-third of the overall length of the bicycle trailer from the distal end of the tow arm to the lower end of the frame, and wherein the transverse frame pivot axis is positioned about one-third of the overall length of the trailer from the lower end of the frame.

12. A bicycle trailer according to claim 6 wherein the tow arm in the tow arm stowed position is positioned between the upper and lower frame sections when the upper and lower frame sections are in the frame stowed position.

13. A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;
a hitch coupled to the tow arm for detachably coupling the tow arm to the bicycle when the tow arm is in the towing position;
a tow arm lock operable in a tow arm lock locking position to prevent pivoting motion of the tow arm relative to the frame and in a tow arm lock release position to allow pivoting motion of the tow arm relative to the frame;
a tow arm lock actuator coupled to the tow arm lock and operable to selectively shift the tow arm lock between the tow arm lock locking position and the tow arm lock release position; and wherein the trailer comprises a load supporting shelf portion coupled to the lower portion of the frame, the shelf portion being coupled to the lower portion of the frame for movement from a first shelf deployed position wherein the shelf portion projects outwardly from the frame to a second shelf stowed position wherein the shelf is positioned adjacent to and facing the frame.

14. A bicycle trailer according to claim 13 wherein the shelf portion comprises first and second spaced apart shelf legs pivoted to the frame with the first shelf leg being positioned adjacent to the first wheel and the second shelf leg being positioned adjacent to the second wheel, the shelf portion further comprising a shelf cross member interconnecting the first and second shelf legs at a location spaced from the frame and from the wheels, a prop pivoted to the shelf cross member and movable from a prop stowed position to a prop deployed position, wherein the prop is of a length such that, when in the prop deployed position, the prop cooperates with the wheels to support the trailer in an upright orientation.

15. A bicycle trailer according to claim 14 comprising a shelf lock operable to selectively lock the shelf portion at least in the shelf deployed position.

16. A bicycle trailer according to claim 15 comprising a shelf lock actuator coupled to the shelf lock, the shelf lock actuator comprising an elongated shelf lock tensioning member coupled to the shelf lock and operable such that tensioning the shelf lock tensioning member releases the shelf lock and permits pivoting of the shelf portion from the shelf deployed to the shelf stowed positions.

17. An apparatus according to claim 16 wherein the shelf lock tensioning member is coupled to the prop such that movement of the prop to the prop deployed position applies tension to the shelf lock tensioning member and releases the shelf lock.

18. A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;
a hitch coupled to the tow arm for detachably coupling the tow arm to the bicycle when the tow arm is in the towing position;
a tow arm lock operable in a tow arm lock locking position to prevent pivoting motion of the tow arm relative to the frame and in a tow arm lock release position to allow pivoting motion of the tow arm relative to the frame;
a tow arm lock actuator coupled to the tow arm lock and operable to selectively shift the tow arm lock between the tow arm lock locking position and the tow arm lock release position; and
comprising a plurality of luggage connectors mounted to the frame, there being at least four transverse rows of luggage connectors with each row comprising first and second luggage connectors at opposite sides of the frame, each such luggage connector comprising a shank portion and a head portion that is enlarged relative to the shank portion, a first luggage member comprising a plurality of frame connectors positioned for coupling to an associated luggage connector of the frame, each frame connector comprising a body having an enlarged connector opening sized for receiving the head portion of an associated connector, the enlarged opening being in communication with a slot of reduced cross sectional dimension in comparison to the cross sectional dimension of the enlarged opening, wherein, following receipt of the head portion of a luggage connector by the enlarged opening of a frame connector, the frame connector is movable to position the shank of the luggage connector in the slot of the frame connector to thereby couple the first luggage member to the frame, and a plurality of luggage members each including a plurality of frame connectors provided such that the luggage members can be interchanged with one another and respectively coupled to the frame by the luggage connectors and frame connectors.

19. A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;
a hitch coupled to the tow arm for detachably coupling the tow arm to the bicycle when the tow arm is in the towing position;
a tow arm lock operable in a tow arm lock locking position to prevent pivoting motion of the tow arm relative to the frame and in a tow arm lock release position to allow pivoting motion of the tow arm relative to the frame;
a tow arm lock actuator coupled to the tow arm lock and operable to selectively shift the tow arm lock between the tow arm lock locking position and the tow arm lock release position;
wherein the hitch comprises a flex coupling comprising a body and first and second end portions, the first end portion being adapted for coupling to the mount and thereby to the bicycle at a location above the rear wheel of the bicycle, the second end portion being adapted for coupling to the tow arm of the trailer, at least one of the first and second end portions being pivotal about an upright pivot axis, the flex coupling pivoting in a first direction about the upright pivot axis during steering of the bicycle in a first direction and pivoting in a second direction about the upright pivot axis during steering of the bicycle in a second direction opposite to the first direction to thereby accommodate steering of the bicycle and trailer, the flex coupling being operable to twist in a first twist direction about a roll axis in the event one of the trailer wheels is elevated relative to the other of the trailer wheels and to apply a resistance force to the trailer that opposes the force arising from the relative elevation of the said one wheel, the flex coupling being operable to twist in a second twist direction about the roll axis substantially opposite to the first twist direction in the event the other of the trailer wheels is elevated relative to the said one of the trailer wheels and to apply a resistance force to the trailer that opposes the force arising from the relative elevation of the said other wheel; and
the flex coupling also being adapted for coupling to the bicycle tow arm and mount so as to flex transversely in the event the first and second wheels of the trailer lift up or drop down to thereby accommodate changes in elevation of the trailer relative to the bicycle.

20. A bicycle trailer according to claim 19 comprising a mount for coupling to the bicycle at a location above a rear wheel of the bicycle.

21. A bicycle trailer according to claim 19 wherein the flex coupling applies a resistance force that is in the range of from 0.75 inch pounds per degree of rotation to 2.1 inch pounds per degree of rotation.

22. A bicycle trailer according to claim 20 wherein the mount comprises a clamp portion adapted for coupling to the seat post or frame member of the bicycle, the mount further comprising a base projecting rearwardly from the clamp portion and an upright pivot pin projecting upwardly from the base, the first end portion of the flex coupling having an upright pin receiving opening sized for pivotally receiving the upright pivot pin, and a flex coupling retainer operable to selectively retain the flex coupling in a position receiving the upright pivot pin and permitting the selective removal of the flex coupling from the upright pivot pin to detach the trailer from the mount.

23. A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a tow arm pivot axis from a tow arm towing position to a tow arm stowed position, the tow arm in the tow arm stowed position being positioned adjacent to the frame, the tow arm in the tow arm towing position projecting outwardly from the frame;
first and second a tow arm locks each operable in a respective tow arm lock locking position to prevent pivoting motion of the tow arm relative to the frame, the first and second tow arm locks also being operable such that when the first and second locks are each in a respective tow arm lock release position, pivoting motion of the tow arm relative to the frame is allowed; and
a tow arm lock actuator coupled to the tow arm locks and operable to selectively shift the tow arm locks together between the tow arm lock locking position and the tow arm lock release position;
wherein the tow arm lock actuator comprises a tow arm release member mounted to the frame and coupled to each of the first and second tow arm locks, the tow arm release member being operable such that moving the tow arm release member in a first direction to a tow arm release member release position allows each of the first and second tow arm locks to simultaneously move to their respective tow arm lock release positions so as to permit pivoting of the tow arm relative to the frame between the tow arm stowed and tow arm towing positions, the tow arm release member also being operable such that moving the tow arm release member in a second direction opposite to the first direction from the tow arm release member release position to the tow arm release member locking position allows each of the first and second tow arm locks to simultaneously move to their respective tow arm lock locking positions to prevent pivoting of the tow arm relative to the frame at least when the tow arm is in the tow arm towing position.

24. A bicycle trailer according to claim 23 A bicycle trailer for a bicycle comprising:
a frame comprising an upper portion and a lower portion;
first and second wheels for coupling to the lower portion of the frame;
a tow arm coupled to the upper portion of the frame, the tow arm being pivotal relative to the frame about a tow arm pivot axis from a tow arm towing position to a tow arm stowed position, the tow arm in the tow arm stowed position being positioned adjacent to the frame, the tow arm in the tow arm towing position projecting outwardly from the frame;
a tow arm lock operable in a tow arm lock locking position to prevent pivoting motion of the tow arm relative to the frame and in a tow arm lock release position to allow pivoting motion of the tow arm relative to the frame; and
a tow arm lock actuator coupled to the tow arm lock and operable to selectively shift the tow arm lock between the tow arm lock locking position and the tow arm lock release position;
wherein the tow arm lock actuator comprises a tow arm release member mounted to the frame and coupled to the tow arm lock, the tow arm release member being operable such that moving the tow arm release member in a first direction to a tow arm release member release position allows the tow arm lock to move to the tow arm lock release position so as to permit pivoting of the tow arm relative to the frame between the tow arm stowed and tow arm towing positions, the tow arm release member also being operable such that the tow arm release member in a second direction opposite to the first direction from the tow arm release member release position to the tow arm release member locking position allows the tow arm lock to move to the tow arm lock locking position to prevent pivoting of the tow arm relative to the frame at least when the tow arm is in the tow arm towing position; and
wherein the tow arm comprises a tow arm portion and first and second towing legs each having a first end portion coupled to the tow arm portion and a distal end portion, the first and second towing legs diverging from one another along at least a portion of the distance from the tow arm portion to the distal ends of the respective first and second towing legs, the frame comprising first and second spaced apart side frame members having respective upper end portions, a first hinge associated with the first towing leg and first frame member and pivotally coupling the distal end portion of the first towing leg to the upper end portion of the first frame member, a second hinge associated with the second towing leg and second frame member and pivotally coupling the distal end portion of the second towing leg to the upper end portion of the second frame member, the tow arm pivot axis being a transverse tow arm pivot axis and the first and second hinges being pivotal about the transverse tow arm pivot axis, the tow arm lock comprising a first lock member associated with the first hinge and a second lock member associated with the second hinge, the first lock member being movable inwardly in a transverse direction toward the second frame member to shift the first lock member from a first lock member locking position to a first lock member release position, the second lock member being movable inwardly in a transverse direction toward the first frame member to shift the second lock member from a second lock member locking position to a second lock member release position, wherein positioning the first and second lock members in their respective first and second lock member locking -positions prevents pivoting of the tow arm relative to the frame about the transverse tow arm pivot axis, wherein positioning the first and second lock members in their respective first and second lock member release positions permits the pivoting of the tow arm about the transverse tow arm pivot axis, a cross member extending transversely between the upper end portions of the first and second frame members, the tow arm release member being coupled to the cross member for pivoting relative to the cross member in the respective first and second directions, the tow arm lock actuator comprising a first cable portion extending from the tow arm release member to the first lock member and a second cable portion extending from the tow arm release member to the second lock member, the tow arm release member being operable such that pivoting of the tow arm release member in the first direction relative to the cross member and to the tow arm release member release position pulls the first and second cable portions inwardly and moves both of the first and second lock members from their respective first and second lock member locking positions to their respective first and second lock member release positions, the tow arm release member also being operable such that pivoting of the tow arm release member in the second direction opposite to the first direction and relative to the cross member to the tow arm release member locking position allows the first and second cable portions to move outwardly and permit both of the first and second lock members to move from their respective first and second lock member release positions to their respective first and second lock member locking positions, a first biasing member associated with the first hinge and coupled to the first lock member and operable to apply a biasing force to the first lock member that urges the first lock member outwardly to the first lock member locking position, and a second biasing member associated with the second hinge and coupled to the second lock member and operable to apply a biasing force to the second lock member that urges the second lock outwardly to the second lock member locking position.

25. A bicycle trailer according to claim 24 wherein the tow arm lock actuator further comprises a first push button lock actuator coupled to the first hinge and a second push button lock actuator coupled to the second hinge, the first push button lock actuator being coupled to the first lock member and the second push button actuator being coupled to the second lock member, the first push button lock actuator being operable such that moving the first push button lock actuator in one direction shifts the first lock member from the first lock member locking position to the first lock member release position and moving the second push button lock actuator in one direction shifts the second lock member from the second lock member locking position to the second lock member release position, whereby the respective first and second hinges can be freed to permit pivoting of the towing arm relative to the frame by either simultaneously actuating the first and second push button lock actuators to shift the first and second lock members to their respective release positions or by pivoting the tow arm release member to the tow arm release member release position.

26. A bicycle trailer according to claim 25 wherein the first and second hinges each comprises first and second hinge members, the first hinge member being mounted to the distal end portion of the associated towing leg and the second hinge member being mounted to upper end portion of the associated frame member, the first and second hinge members being allowed to pivot relative to one another when the associated lock member is in the lock member release position, one of the first and second hinge members defining at least first, second and third locking flange receiving slots at predetermined angular positions about the transverse tow arm pivot axis, the associated lock member comprising first and second locking flanges at predetermined angular positions about the transverse tow arm pivot axis, the associated lock member being mounted intermediate to the first and second hinge members for pivoting about the transverse tow arm pivot axis, the locking flange receiving slots and first and second locking flanges being positioned such that one of the first and second locking flanges is positioned in the first locking flange receiving slot and the other of the first and second locking flanges is positioned in the second locking flange receiving slot when the tow arm is in the tow arm towing position, and such that one of the first and second locking flanges is positioned in one of the first and second flange receiving slots and the other of the first and second locking flanges is positioned in the third flange receiving slot when the tow arm is in the tow arm stowed position to thereby lock the first hinge in the respective towing and stowed positions.

27. A bicycle trailer according to claim 24 comprising a load supporting shelf portion coupled to a lower end portion of the frame spaced from the hitch, the shelf portion being foldable from a first shelf deployed position wherein the shelf portion projects outwardly from the frame to a second shelf stowed position wherein the shelf is positioned adjacent to and facing the frame;
  wherein the shelf portion comprises first and second spaced apart shelf legs pivoted to the frame with the first shelf leg being positioned adjacent to the first wheel and the second shelf leg being positioned adjacent to the second wheel, the shelf portion further comprising a shelf cross member interconnecting the first and second shelf legs at a location spaced from the frame and from the wheels;
  a shelf lock operable to selectively lock the shelf in the shelf deployed position;
  wherein the shelf lock comprises first plunger coupled to the first shelf leg and slidable between a retracted position and extended position, a first plunger biasing member coupled to the first plunger and operable to bias the first plunger to the extended position, a second plunger coupled to the second shelf leg and slidable between a retracted position and extended position, a second plunger biasing member coupled to the second plunger and operable to bias the second plunger to the extended position, at least one plunger actuating cable coupled to and associated with the first plunger and at least one plunger actuating cable coupled to and associated with the second plunger, the actuating cable being coupled to the associated plunger such that tension on the actuating cable shifts the associated plunger from the extended to the retracted positions, a first shelf hinge coupling the first shelf leg to the frame and a second shelf hinge coupling the second shelf leg to the frame, each shelf hinge defining a locking cavity configured and positioned such that, upon positioning of the shelf in the shelf deployed position and without tension on the associated actuating cable, each plunger is shifted by the associated plunger biasing member to the extended position and is positioned in the associated locking cavity and locks the associated shelf hinge to prevent pivoting of the shelf relative to the frame, and tensioning the cable moves the plungers to the retracted position and releases the shelf hinges to allow pivoting of the shelf relative to the frame.

28. A bicycle trailer for a bicycle comprising:
  a frame comprising an upper portion and a lower portion;
  first and second wheels for coupling to the lower portion of the frame;

a tow arm coupled to the upper portion of the frame, the tow arm being pivotal relative to the frame about a tow arm pivot axis from a tow arm towing position to a tow arm stowed position, the tow arm in the tow arm stowed position being positioned adjacent to the frame, the tow arm in the tow arm towing position projecting outwardly from the frame;

a tow arm lock operable in a tow arm lock locking position to prevent pivoting motion of the tow arm relative to the frame and in a tow arm lock release position to allow pivoting motion of the tow arm relative to the frame; and a tow arm lock actuator coupled to the tow arm lock and operable to selectively shift the tow arm lock between the tow arm lock locking position and the tow arm lock release position;

wherein the frame comprises upper and lower frame sections, the upper frame section being pivotally coupled to the lower frame section for pivoting relative to the lower frame section to permit pivoting of the upper frame section about the frame pivot axis toward the lower frame section;

wherein the tow arm lock actuator comprises a tow arm release member pivoted to the frame and coupled to the tow arm lock, the tow arm release member being operable such that pivoting the tow arm release member in a first direction to a tow arm release member release position allows the tow arm lock to move to the tow arm lock release position so as to permit pivoting of the tow arm relative to the frame between the tow arm stowed and tow arm towing positions, the tow arm release member also being operable such that pivoting the tow arm release member in a second direction opposite to the first direction from the tow arm release member release position to the tow arm release member locking position allows the tow arm lock to move to the tow arm lock locking position to prevent pivoting of the tow arm relative to the frame at least when the tow arm is in the tow arm towing position;

a frame lock operable in a frame lock locking position to prevent pivoting of the upper frame section about the transverse frame pivot axis relative to the lower frame section and in a frame lock release position to allow pivoting of the upper frame section about the transverse frame pivot axis relative to the lower frame section;

a frame lock actuator coupled to the frame lock and operable to selectively shift the frame lock between the frame lock locking position and the frame lock release position;

wherein the frame lock actuator comprises a frame release member pivoted to the frame and coupled to the frame lock, the frame release member being operable such that pivoting the frame arm release member in a first direction to a frame release member release position allows the frame lock to move to the frame lock release position so as to permit pivoting of the upper frame section relative to the lower frame section between a frame stowed position wherein the upper and lower frame sections are adjacent to one another and face one another and a frame deployed position wherein the upper frame section is positioned substantially above the lower frame section, the frame release member also being operable such that pivoting the frame release member in a second direction opposite to the first direction from the frame release member release position to the frame release member locking position allows the frame lock to move to the frame lock locking position to prevent pivoting of the upper frame section relative to the lower frame section and about the transverse frame axis at least when the upper and lower frame sections are in the frame deployed position.

29. A bicycle trailer according to claim 28 comprising first and second frame hinges, the first frame hinge coupling a first lower portion of the upper frame section to a first upper portion of the lower frame section and the second frame hinge coupling a second portion of the upper frame section to a second upper portion of the lower frame section, the frame lock comprising a first hinge lock operable to selectively lock the first hinge to prevent relative pivoting of the upper and lower frame sections about the transverse frame pivot axis and operable to selectively unlock the first frame hinge to permit relative pivoting of the upper and lower frame sections about the transverse frame pivot axis, the frame lock comprising a second hinge lock operable to selectively lock the second hinge to prevent relative pivoting of the upper and lower frame sections about the transverse frame pivot axis and operable to selectively unlock the second frame hinge to permit relative pivoting of the upper and lower frame sections about the transverse frame pivot axis, the frame lock actuator comprising a first frame lock actuator coupled to both of the first and second hinge locks and operable to selectively unlock both of the first and second hinge locks upon shifting the first lock actuator to an unlocking position and operable to selectively lock the first and second hinge locks upon shifting the first lock actuator to a second locking position, a second frame lock actuator coupled to the first hinge lock and selectively operable to lock and unlock the first frame hinge, a third frame lock actuator coupled to the second hinge lock and selectively operable to lock and unlock the second hinge lock, the second hinge lock actuator being operable independently of the third hinge lock actuator and the third hinge lock actuator being operable independently of the second hinge lock actuator.

30. A bicycle trailer according to claim 28 wherein the upper frame section comprises first and second spaced apart side frame members having respective lower end portions and the lower frame section comprises first and second spaced apart side frame members having respective upper end portions, a first frame hinge associated with the first upper and first lower side frame members and pivotally coupling the lower end portion of the first upper side frame member to the upper end portion of the first lower side frame member, a second frame hinge associated with the second upper and second lower side frame members and pivotally coupling the lower end portion of the second lower side frame member to the upper end portion of the second side frame member, the first and second frame hinges being pivotal about the transverse frame pivot axis, the frame lock comprising a first frame lock member associated with the first frame hinge and a second frame lock member associated with the second frame hinge, the first frame lock member being movable in a transverse direction toward the second frame member to shift the first frame lock member from a first frame lock member locking position to a first frame lock member release position, the second frame lock member being movable in a transverse direction toward the first frame member to shift the second frame lock member from a second frame lock member locking position to a second frame lock member release position, wherein positioning the first and second frame lock members in their respective first and second frame lock member locking positions prevents pivoting of the upper frame section relative to the lower frame section about the transverse frame pivot axis, wherein positioning the first and second frame lock members in their respective first and second frame lock member release positions permits the pivoting of the upper frame section relative to the lower frame section about the transverse frame pivot axis, a frame cross member extending transversely between the upper end portions of the first and second frame members of the lower frame section, the frame release member being coupled to the frame cross member for pivoting relative to the frame cross member in the respective first and second directions, the frame lock actuator comprising a first cable portion extending from the frame release member to the first frame lock member and a second cable portion extending from the frame release member to the second frame lock member, the frame release member being operable such that pivoting of the frame release member in the first direction relative to the frame cross member and to the frame release member release position pulls the first and second cable portions inwardly and moves both of the first and second frame lock members from their respective first and second frame lock member locking positions to their respective first and second frame lock member release positions, the frame release member also being operable such that pivoting of the frame release member in the second direction opposite to the first direction and relative to the frame cross member to the frame release member locking position allows the first and second cable portions to move outwardly and permit both of the first and second frame lock members to move from their respective first and second frame lock member release positions to their respective first and second frame lock member locking positions, a first frame hinge biasing member associated with the first frame hinge and coupled to the first frame lock member and operable to apply a biasing force to the first frame lock member that urges the first frame lock member outwardly to the first frame lock member locking position, and a second frame hinge biasing member associated with the second frame hinge and coupled to the second frame lock member and operable to apply a biasing force to the second frame lock member that urges the second frame lock outwardly to the second frame lock member locking position.

31. A bicycle trailer according to claim 30 wherein the first and second frame hinges each comprises first and second frame hinge members, the first frame hinge member being mounted to the lower end portion of the associated side frame member of the upper frame section and the second frame hinge member being mounted to the upper end portion of the associated side frame member of the lower frame section, the first and second frame hinge members being allowed to pivot relative to one another when the associated frame lock member is in the frame lock member release position, one of the first and second frame hinge members defining at least first, second and third frame locking flange receiving slots at predetermined angular positions about the transverse frame pivot axis, the associated frame lock member comprising first and second frame locking flanges at predetermined angular positions about the transverse frame pivot axis, the associated frame lock member being mounted intermediate to the first and second frame hinge members for pivoting about the transverse tow arm pivot axis, the frame locking flange receiving slots and first and second frame locking flanges being positioned such that one of the first and second frame locking flanges is positioned in the first frame locking flange receiving slot and the other of the first and second frame locking flanges is positioned in the second frame locking flange receiving slot when the frame is in the frame deployed position, and such that one of the first and second frame locking flanges is positioned in one of the first and second frame flange receiving slots and the other of the first and second frame locking flanges is positioned in the third frame flange receiving slot when the frame is in the frame stowed position to thereby lock the first and second frame sections in the respective frame deployed and frame stowed positions.

32. A bicycle trailer according to claim 30 comprising a load supporting shelf portion coupled to a lower end portion of the frame spaced from the hitch, the shelf portion being foldable from a first shelf deployed position wherein the shelf portion projects outwardly from the frame to a second shelf stowed position wherein the shelf is positioned adjacent to and facing the frame;
   wherein the shelf portion comprises first and second spaced apart shelf legs pivoted to the frame with the first shelf leg being positioned adjacent to the first wheel and the second shelf leg being positioned adjacent to the second wheel, the shelf portion further comprising a shelf cross member interconnecting the first and second shelf legs at a location spaced from the frame and from the wheels;
   a shelf lock operable to selectively lock the shelf in the shelf deployed position;
   wherein the shelf lock comprises first plunger coupled to the first shelf leg and slidable between a retracted position and extended position, a first plunger biasing member coupled to the first plunger and operable to bias the first plunger to the extended position, a second plunger coupled to the second shelf leg and slidable between a retracted position and extended position, a second plunger biasing member coupled to the second plunger and operable to bias the second plunger to the extended position, at least one plunger actuating cable coupled to and associated with the first plunger and at least one plunger actuating cable coupled to and associated with the second plunger, the actuating cable being coupled to the associated plunger such that tension on the actuating cable shifts the associated plunger from the extended to the retracted positions, a first shelf hinge coupling the first shelf leg to the frame and a second shelf hinge coupling the second shelf leg to the frame, each shelf hinge defining a locking cavity configured and positioned such that, upon positioning of the shelf in the shelf deployed position and without tension on the associated actuating cable, each plunger is shifted by the associated plunger biasing member to the extended position and is positioned in the associated locking cavity and locks the associated shelf hinge to prevent pivoting of the shelf relative to the frame, and tensioning the cable moves the plungers to the retracted position and releases the shelf hinges to allow pivoting of the shelf relative to the frame.

33. A bicycle trailer for a bicycle comprising:
   a frame;
   first and second wheels for coupling to a lower portion of the frame;
   a tow arm coupled to an upper portion of the frame, the tow arm being pivotal relative to the frame about a transverse tow arm pivot axis from a tow arm towing position to a tow arm stowed position, the tow arm in the tow arm stowed position being positioned adjacent to the frame, the tow arm in the tow arm towing position projecting outwardly from the frame;
   a tow arm lock operable in a tow arm lock locking position to prevent pivoting motion of the tow arm relative to the frame and in a tow arm lock release position to allow pivoting motion of the tow arm relative to the frame;
   a tow arm lock actuator coupled to the tow arm lock and operable to selectively shift the tow arm lock between the tow arm lock locking position and the tow arm lock release position;

wherein the frame comprises upper and lower frame sections, the upper frame section being pivotally coupled to the lower frame section for pivoting relative to the lower frame section about a transverse frame pivot axis to permit pivoting of the upper frame section toward the lower frame section to a frame stowed position wherein the upper frame section faces the lower frame section; and wherein the tow arm in the tow arm stowed position is positioned between the upper and lower frame sections when the upper and lower frame sections are in the frame stowed position.

34. A bicycle trailer for a bicycle comprising:

a frame;

first and second wheels for coupling to a lower portion of the frame;

a tow arm coupled to an upper portion of the frame, the tow arm being pivotal relative to the frame about a tow arm pivot axis from a tow arm towing position to a tow arm stowed position, the tow arm in the tow arm stowed position being positioned adjacent to the frame, the tow arm in the tow arm towing position projecting outwardly from the frame;

a first tow arm hinge for coupling a first portion of the tow arm to the frame and a second tow arm hinge for coupling a second portion of a tow arm to the frame, a first tow arm hinge lock operable to selectively lock the first tow arm hinge to prevent relative pivoting of the tow arm and the frame and operable to selectively unlock the first tow arm hinge to permit relative pivoting of the tow arm and frame, a second tow arm hinge lock operable to selectively lock the second tow arm hinge to prevent relative pivoting of the tow arm and the frame and operable to selectively unlock the second tow arm hinge to permit relative pivoting of the tow arm and frame, a first tow arm lock actuator coupled to both of the first and second tow arm hinge locks and operable to selectively unlock both of the first and second tow arm hinge locks upon shifting the first tow arm lock actuator to an unlocking position and operable to selectively lock the first and second tow arm hinge locks upon shifting the first tow arm lock actuator to a second locking position, a second tow arm lock actuator coupled to the first tow arm hinge lock and selectively operable to lock and unlock the first tow arm hinge, a third tow arm lock actuator coupled to the second tow arm hinge lock and selectively operable to lock and unlock the second tow arm hinge lock, the second tow arm hinge lock actuator being operable independently of the third tow arm hinge lock actuator and the third tow arm hinge lock actuator being operable independently of the second tow arm hinge lock actuator.

35. A bicycle trailer according to claim 34 wherein the frame comprises first and second frame sections pivotally interconnected so as to be pivotal relative to one another about a frame pivot axis, the tow arm being coupled to an upper portion of the first frame section, first and second spaced apart frame hinges pivotally interconnecting the first and second frame sections, the first frame hinge coupling a first lower portion of the first frame section to a first upper portion of the second frame section and the second frame hinge coupling a second portion of the first frame section to a second portion of the second frame section, a first hinge lock operable to selectively lock the first hinge to prevent relative pivoting of the first and second frame sections about the frame pivot axis and operable to selectively unlock the first frame hinge to permit relative pivoting of the first and second frame sections about the frame pivot axis, the frame lock comprising a second hinge lock operable to selectively lock the second hinge to prevent relative pivoting of the first and second frame sections about the frame pivot axis and operable to selectively unlock the second frame hinge to permit relative pivoting of the first and second frame sections about the frame pivot axis, a first frame lock actuator coupled to both of the first and second hinge locks and operable to selectively unlock both of the first and second hinge locks upon shifting the first lock actuator to an unlocking position and operable to selectively lock the first and second hinge locks upon shifting the first lock actuator to a second locking position, a second frame lock actuator coupled to the first hinge lock and selectively operable to lock and unlock the first frame hinge, a third frame lock actuator coupled to the second hinge lock and selectively operable to lock and unlock the second hinge lock, the second frame hinge lock actuator being operable independently of the third frame hinge lock actuator and the third frame hinge lock actuator being operable independently of the second frame hinge lock actuator.

36. A bicycle trailer for a bicycle according to claim 35 wherein the first frame lock actuator comprises a pivot frame lock actuator member coupled to the first and second hinge locks and operable such that pivoting the frame lock actuator in one direction locks the first and second frame hinges and pivoting the frame lock actuator in a direction opposite to said one direction unlocks the first and second frame hinges, and wherein the second and third frame hinge lock actuators comprise push button actuated frame hinge lock actuators; and wherein the first tow arm lock actuator comprises a pivot tow arm lock actuator member coupled to the first and second tow arm hinge locks and operable such that pivoting the tow arm lock actuator in one direction locks the first and second tow arm; whereby the respective first and second two arm hinges can be freed to permit pivoting of the towing arm relative to the frame by either simultaneously actuating the first and second push button tow arm lock actuators or by pivoting the tow arm lock actuating member, and whereby the respective first and second frame hinges can be freed to permit pivoting of the first frame section relative to the second frame section by either simultaneously actuating the first and second push button frame lock actuators or by pivoting the pivot frame lock actuator.

37. A bicycle trailer according to claim 34 comprising a hitch coupled to the tow arm for detachably coupling the tow arm to the bicycle when the tow arm is in the towing position, the hitch comprising a flex coupling comprising a body and first and second end portions, the first end portion being adapted for coupling to the mount and thereby to the bicycle at a location above the rear wheel of the bicycle, the second end portion being adapted for coupling to the tow arm of the trailer, at least one of the first and second end portions being pivotal about an upright pivot axis, the flex coupling pivoting in a first direction about the upright pivot axis during steering of the bicycle in a first direction and pivoting in a second direction about the upright pivot axis during steering of the bicycle in a second direction opposite to the first direction to thereby accommodate steering of the bicycle and trailer, the flex coupling being operable to twist in a first twist direction about a roll axis in the event one of the trailer wheels is elevated relative to the other of the trailer wheels and to apply a resistance force to the trailer that opposes the force arising from the relative elevation of the said one wheel, the flex coupling being operable to twist in a second twist direction about the roll axis substantially opposite to the first twist direction in the event the other of the trailer wheels is elevated relative to the said one of the trailer wheels and to apply a resistance force to the trailer that opposes the force arising from the relative elevation of the said other wheel, wherein the flex coupling applies a resistance force that is in the range of from 0.75 inch pounds per degree of rotation to 2.1 inch pounds per degree of rotation; and the flex coupling also being adapted for coupling to the bicycle tow arm and bicycle so as to flex transversely in the event the first and second wheels of the trailer lift up or drop down to thereby accommodate changes in elevation of the trailer relative to the bicycle.

38. A bicycle trailer according to claim 37 comprising a mount for coupling to a bicycle at a location above a rear wheel of the bicycle.

39. A bicycle trailer for bicycle comprising:
a frame comprising first and second frame sections that are pivotally interconnected so as to pivot relative to one another about a frame pivot axis;
means for selectively locking and unlocking the first and second frame sections from one another to respectively permit and block relative pivoting of the first and second frame sections;
first and second wheels for coupling to a lower one of said first and second frame sections;
a tow arm pivotally coupled to an upper portion of an upper of the first and second frame sections for pivoting about a tow arm pivot axis from a first towing position to a second tow arm stowed position;
means for selectively locking the tow arm and for selectively unlocking the tow arm to respectively allow pivoting of the tow arm relative to the upper frame section and block pivoting of the tow arm relative to the upper frame section; and
hitch means for coupling the tow arm to the bicycle at least when the tow arm is in the towing position.

40. A method of collapsing a bicycle trailer comprising the acts of:
pivoting a tow arm of the bicycle trailer about a tow arm pivot axis from a towed position to a stowed position wherein the tow arm is positioned facing a frame section of a portion of a frame of the bicycle trailer;
pivoting a first frame section of the bicycle trailer about a frame pivot axis relative to a second frame section and from a frame extended position to a frame stowed position wherein when in the frame stowed position the first frame section faces the second frame;
pivoting a shelf portion of the bicycle trailer about a shelf pivot axis toward one of the frame sections; and
removing the wheels of the bicycle trailer.

41. A method according to claim 40 wherein an act of pivoting the tow arm to a stowed position takes place prior to the act of pivoting the first frame section about the frame pivot axis such that the tow arm in the tow arm stowed position is between the first and second frame sections when the trailer is collapsed.

42. A method according to claim 40 comprising the act of selectively locking the tow arm in the tow arm towing and stowed positions and selectively locking the first and second frame sections in the extended and stowed positions.

43. A method according to claim 40 comprising the act of selectively locking first and second tow arm hinges against rotation when the tow arm is in the tow arm towing position and selectively unlocking the first and second tow arm hinges to permit pivoting of the tow arm from the tow arm towing position to the tow arm stowed position, the act of selectively unlocking the first and second tow arm hinges comprising the act of selectively actuating a single tow arm lock actuator to simultaneously unlock the first and second tow arm hinges; and comprising the act of selectively locking first and second frame arm hinges against rotation when the first and second frame sections are in the extended position and selectively unlocking the first and second frame hinges to permit pivoting of the first and second frame sections to the frame stowed position, the act of selectively unlocking the first and second frame hinges comprising the act of selectively actuating a single frame lock actuator to simultaneously unlock the first and second frame sections to permit pivoting of the frame sections relative to one another.

\* \* \* \* \*

UNITED STATES PATENT AND TRADEMARK OFFICE
CERTIFICATE OF CORRECTION

| | | |
|---|---|---|
| PATENT NO. | : 8,419,035 B2 | Page 1 of 1 |
| APPLICATION NO. | : 12/887336 | |
| DATED | : April 16, 2013 | |
| INVENTOR(S) | : Wilson et al. | |

It is certified that error appears in the above-identified patent and that said Letters Patent is hereby corrected as shown below:

In the Specification:

Column 1, line 26, "access" should read -- axis --

Column 1, line 38, "release the" should read -- release of the --

Signed and Sealed this
Twenty-fourth Day of May, 2016

Michelle K. Lee
*Director of the United States Patent and Trademark Office*